United States Patent
Hashimoto et al.

(10) Patent No.: US 9,881,270 B2
(45) Date of Patent: Jan. 30, 2018

(54) INFORMATION PROCESSING DEVICE, POWER-DEMANDING OBJECT, INFORMATION PROCESSING METHOD, AND NON-TRANSITORY STORAGE MEDIUM

(71) Applicant: NEC Corporation, Tokyo (JP)

(72) Inventors: Ryo Hashimoto, Tokyo (JP); Hitoshi Yano, Tokyo (JP); Hisato Sakuma, Tokyo (JP); Koji Kudo, Tokyo (JP); Eisuke Saneyoshi, Tokyo (JP); Takahiro Toizumi, Tokyo (JP); Kosuke Homma, Tokyo (JP); Yuma Iwasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/031,468

(22) PCT Filed: Sep. 29, 2014

(86) PCT No.: PCT/JP2014/075917
§ 371 (c)(1),
(2) Date: Apr. 22, 2016

(87) PCT Pub. No.: WO2015/064267
PCT Pub. Date: May 7, 2015

(65) Prior Publication Data
US 2016/0291557 A1     Oct. 6, 2016

(30) Foreign Application Priority Data
Oct. 31, 2013   (JP) ................................ 2013-227374

(51) Int. Cl.
*G05B 19/042*   (2006.01)
*G06Q 10/06*    (2012.01)
(Continued)

(52) U.S. Cl.
CPC ....... *G06Q 10/06314* (2013.01); *G05B 15/02* (2013.01); *G06Q 50/06* (2013.01);
(Continued)

(58) Field of Classification Search
CPC .......... G05B 19/042; G05B 2219/2639; G06Q 10/06314; G06Q 50/06; H02J 3/00; H02J 2003/003
See application file for complete search history.

(56) References Cited

U.S. PATENT DOCUMENTS

| | | | |
|---|---|---|---|
| 8,417,391 B1 | 4/2013 | Rombouts et al. | |
| 2009/0062967 A1* | 3/2009 | Kressner | B60L 11/14 700/286 |

(Continued)

FOREIGN PATENT DOCUMENTS

| | | |
|---|---|---|
| EP | 2722957 A1 | 4/2014 |
| JP | 2009-124885 A | 6/2009 |

(Continued)

OTHER PUBLICATIONS

Hitoshi Yano et al., A Novel Charging-Time Control Method for Numerous EVs based on a Period Weighted Prescheduling for Power Supply and Demand Balancing, Jan. 20, 2012, 6 pages.*

(Continued)

*Primary Examiner* — Sean Shechtman
*Assistant Examiner* — Tri T Nguyen
(74) *Attorney, Agent, or Firm* — Wilmer Cutler Pickering Hale & Dorr

(57) ABSTRACT

A time range setting unit (110) sets an operation startable time point at which an operation can be started and a target operation end time point which is the latest time point among time points at which the operation is to be ended, with respect to each of plural power demanding objects (20). A necessary operation time setting unit (120) sets a neces- (Continued)

sary operation time with respect to each of the plural power demanding objects (20). A shape information acquisition unit (130) acquires shape information from a schedule management device (40). The shape information indicates an assumed shape of a transition line that represents transition in the amount of supplied power in a target period. A demand transition setting unit (140) sets power demand transition information indicating transition in an electric energy demand in the target period so that the necessary operation time is obtained and so that the transition in the electric energy demand generated by the plural power demanding objects (20) being operated accords with the assumed shape.

9 Claims, 21 Drawing Sheets

(51) Int. Cl.
 *G05B 15/02* (2006.01)
 *G06Q 50/06* (2012.01)
 *H02J 3/00* (2006.01)
(52) U.S. Cl.
 CPC ........ *H02J 3/00* (2013.01); *G05B 2219/2639* (2013.01); *H02J 2003/003* (2013.01); *Y04S 10/126* (2013.01); *Y04S 10/54* (2013.01)

(56) References Cited

U.S. PATENT DOCUMENTS

| | | | |
|---|---|---|---|
| 2010/0012406 A1 | 1/2010 | Kressner et al. | |
| 2010/0017043 A1 | 1/2010 | Kressner et al. | |
| 2010/0017044 A1 | 1/2010 | Kressner et al. | |
| 2010/0023178 A1 | 1/2010 | Kressner et al. | |
| 2010/0256830 A1 | 10/2010 | Kressner et al. | |
| 2012/0019205 A1 | 1/2012 | Kressner et al. | |
| 2012/0124406 A1* | 5/2012 | Lu ............................ | G06F 1/30 713/340 |
| 2013/0127443 A1 | 5/2013 | Honjo et al. | |
| 2013/0178991 A1 | 7/2013 | Gheerardyn et al. | |
| 2013/0178993 A1 | 7/2013 | Rombouts et al. | |
| 2014/0117933 A1 | 5/2014 | Nyu | |
| 2015/0057824 A1 | 2/2015 | Gheerardyn et al. | |

FOREIGN PATENT DOCUMENTS

| | | |
|---|---|---|
| JP | 2009-213338 A | 9/2009 |
| JP | 2010-512727 A | 4/2010 |
| JP | 2011-234570 A | 11/2011 |
| JP | 2013-059204 A | 3/2013 |

OTHER PUBLICATIONS

International Search Report corresponding to PCT/JP2014/075917, dated Oct. 21, 2014, 1 page.
Ninomiya et al, "A Study on Power Variation Control of Photovoltaic System using EV" (pp. 1-5 complete English Translation); A Conference of Power and Energy Society, The Institute of Electrical Engineers of Japan, 2011, Proceedings, Aug. 30 to Sep. 1, 2011, Lecture No. P40, pp. 83-84, "Denkijidosha wo mochiita Taiyokohatsuden no Shutsuryokuhendo yokusei no Ichikosatsu (A Study on Power Variation Control of Photovoltaic System using EV)" (8 pages total).
Yano et al, ISGT, "A Novel Charging-Time Control Method for Numerous EVs based on a Period Weighted Prescheduling for Power Supply and Demand Balancing" 2011, 6 pages.
Extended European Search Report issued by the European Patent Office for European Application No. 14857088.0 dated Jun. 30, 2017 (6 pp.).

* cited by examiner

INFORMATION PROCESSING DEVICE, POWER-DEMANDING OBJECT, INFORMATION PROCESSING METHOD, AND NON-TRANSITORY STORAGE MEDIUM

CROSS-REFERENCE TO RELATED APPLICATIONS

This application is a national stage application of International Application No. PCT/JP2014/075917 entitled "INFORMATION PROCESSING DEVICE, POWER-DEMANDING OBJECT, INFORMATION PROCESSING METHOD, AND PROGRAM," filed on Sep. 29, 2014, which claims the benefit of the priority of Japanese Patent Application No. 2013-227374 filed on Oct. 31, 2013, the disclosures of each of which are hereby incorporated by reference in their entirety.

TECHNICAL FIELD

The present invention relates to an information processing device, a power demanding object, an information processing method, and a program that assist setting of a power demand schedule.

BACKGROUND ART

In order to efficiently use electric power, it is preferable that the supply and demand of power match each other. In general, the amount of supplied power is determined to match predicted power demand.

In this regard, Patent Document 1 discloses a technique in which a management device is mounted in a manufacturing facility or the like of a power-demander and a target value of the amount of used power is transmitted to the management device.

Further, Patent Document 2 discloses a technique in which batteries of an electric vehicle are considered as dispersive power resources and the plural power resources are controlled according to a predetermined schedule.

Meanwhile, in recent years, power generation using renewable energy such as solar cell power generation or wind power generation has increased. In such a power generation method, it is difficult to control the amount of generated power. In this case, with a general method, it is difficult to achieve the supply-demand balance of power.

In this regard, Non-Patent Document 1 discloses a technique that reduces an output variation in solar cell power generation using an electric vehicle. Further, Non-Patent Document 2 discloses the following technique. First, charging time zones of electric vehicles and a target total charging power are set with respect to a power-generation and demand schedule made in consideration of surplus power that is predicted in advance. Then, in an operation of the scheduled day, the order of priority based on the necessity of charging is assigned to plural electric vehicles, and the number of electric vehicles necessary for achieving the target total charging power are selected.

RELATED DOCUMENT

Patent Document

[Patent Document 1] Japanese Unexamined Patent Application Publication No. 2009-124885
[Patent Document 2] PCT Japanese Translation Patent Application Publication No. 2010-512727

Non-Patent Document

[Non-Patent Document 1] Ninomiya et al, Conference of Power and Energy Society, The Institute of Electrical Engineers of Japan, 2011, Proceedings, Aug. 30 to Sep. 1, 2011, Lecture No. P40, pp. 83-84, "Denkijidosha wo mochiita Taiyokohatsuden no Shutsuryokuhendo yokusei no Ichikosatsu (A study on output variation suppression of photovoltaic power generation using electric vehicles)"
[Non-Patent Document 2] H. Yano et al, ISGT, p 156-162, 2012, "A Novel Charging-Time Control Method for Numerous EVs based on a Period Weighted Prescheduling for Power Supply and Demand Balancing"

SUMMARY OF THE INVENTION

Technical Problem

The present inventors found that if a demand target within a target period is arbitrarily set, there is a case where it is substantially impossible to realize the demand target. For example, in a case where a considerably large value is set as the demand target, the number of electric vehicles charged in the target period may be too small to secure the amount of charged power cannot be secured. Thus, if the setting is performed so that the demand target is achieved at the beginning of the target period, it may be impossible to maintain the demand at the latter half of the target period. Contrarily, in a case where a target value is set to be small in order to reliably achieve the demand target, the capability of stabilizing the supply-demand balance which is an original purpose is lowered.

An object of the invention is to provide an information processing device, a power demanding object, an information processing method, and a program that assist setting of an appropriate demand schedule.

Solution to Problem

According to an aspect of the invention, there is provided an information processing device including: a time range setting unit that sets an operation startable time point at which an operation can be started and a target operation end time point which is the latest time point among time points at which the operation is to be ended, with respect to each of a plurality of power demanding objects that generates power demand; a necessary operation time setting unit that sets a necessary operation time which corresponds to a length of a time period during which the operation is to be performed, which is equal to or shorter than a time period from the operation startable time point to the target operation end time point, with respect to each of the plurality of power demanding objects; a shape information acquisition unit that acquires shape information indicating an assumed shape of a transition line that represents transition in the amount of supplied power in a target period; and a demand transition setting unit that sets, so that the necessary operation time is obtained and so that transition in an electric energy demand generated by the plurality of power demanding objects being operated accords with the assumed shape, power demand transition information indicating the transition in the electric energy demand in the target period. In the information processing device, the demand transition setting unit updates the power demand transition information when the shape information acquisition unit updates the shape information, and the information processing device further includes a demand transition preliminary information generation unit that generates power demand transition preliminary information used in further updating the power demand transition information based on the power demand transition information after being updated and the power demand transition information before being updated.

According to another aspect of the invention, there is provided a power demanding object that receives an operation schedule from the information processing device described above and is operated according to the operation schedule.

According to still another aspect of the invention, there is provided an information processing method including: setting an operation startable time point at which an operation can start and a target operation end time point which is the latest time point among time points at which the operation is to be ended, with respect to each of a plurality of power demanding objects that generates power demand; setting a necessary operation time which corresponds to a length of a time period during which the operation is to be performed, which is equal to or shorter than a time period from the operation startable time point to the target operation end time point, with respect to each of the plurality of power demanding objects; acquiring shape information indicating an assumed shape of a transition line that represents transition in the amount of supplied power in a target period, by a computer; setting, so that the necessary operation time is obtained and so that transition in an electric energy demand generated as the plurality of power demanding objects is operated accords with the assumed shape, power demand transition information indicating the transition in the electric energy demand in the target period, by the computer; updating the power demand transition information when the shape information is updated, by the computer; and generating power demand transition preliminary information used in further updating the power demand transition information based on the power demand transition information after being updated and the power demand transition information before being updated, by the computer.

According to still another aspect of the invention, there is provided a program that causes a computer to realize functions including: a function of setting an operation startable time point at which an operation can start and a target operation end time point which is the latest time point among time points at which the operation is to be ended, with respect to each of a plurality of power demanding objects that generates power demand; a function of setting a necessary operation time which corresponds to a length of a time period during which the operation is to be performed, which is equal to or shorter than a time period from the operation startable time point to the target operation end time point, with respect to each of the plurality of power demanding objects; a function of acquiring shape information indicating an assumed shape of a transition line that represents transition in the amount of supplied power in a target period; a function of setting, so that the necessary operation time is obtained and so that transition in an electric energy demand generated by the plurality of power demanding objects being operated accords with the assumed shape, power demand transition information indicating the transition in the electric energy demand in the target period; a function of updating the power demand transition information when the shape information is updated, by the demand transition setting unit; and a function of generating power demand transition preliminary information used in further updating the power demand transition information based on the power demand transition information after being updated and the power demand transition information before being updated.

Advantageous Effects of Invention

According to the invention, it is possible to assist setting of an appropriate demand schedule.

BRIEF DESCRIPTION OF THE DRAWINGS

The above-described objects and other objects, features and advantages will become more apparent by the following description of preferred exemplary embodiments and the accompanying drawings.

DESCRIPTION OF EXEMPLARY EMBODIMENTS

Figure 1:
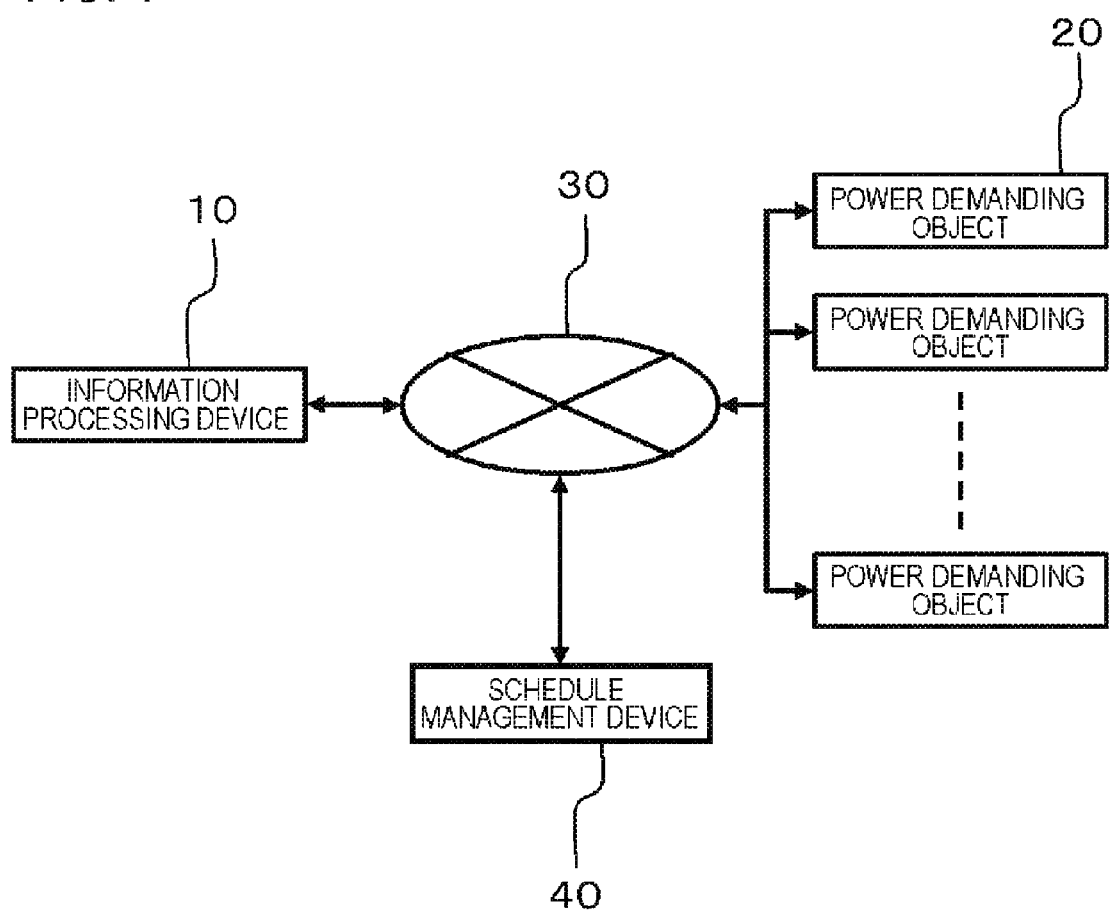
FIG. 1 is a diagram illustrating a usage environment of an information processing device according to a first exemplary embodiment.

Hereinafter, exemplary embodiments of the invention will be described with reference to the accompanying drawings. In the entire drawings, the same reference numerals are given to the same components, and description thereof will not be repeated.

In the following description, respective components of each device show blocks in a function unit, instead of a configuration in a hardware unit. The respective components of each device are realized by an arbitrary combination of hardware and software including a CPU, a memory, a program that realizes components of the figures loaded in the memory, a storage medium such as a hard disk that stores the program, and a network connection interface in an arbitrary computer. Further, there are various modification examples in a method and a device for the realization.

First Exemplary Embodiment

FIG. 1 is a diagram illustrating a usage environment of an information processing device 10 according to a first exemplary embodiment. The information processing device 10 performs communication with plural power demanding objects 20 and a schedule management device 40 through a communication network 30.

The power demanding object 20 is, for example, an electric device or a charger that generates power demand. More specifically, the power demanding object 20 corresponds to at least one of a charging station of an electric vehicle, a heat pump that converts electric energy into thermal energy for storage, a mobile communication terminal, a computer having a charger, an electric assist bicycle, and a robot having a charger. The heat pump may be used indoors as an air conditioner.

The schedule management device 40 is a device used when a temporal transition schedule of electric energy supplied to a power network is established. The power demanding objects 20 are connected to the power network. Further, the information processing device 10 is a device used when an operation schedule of the power demanding objects 20 is established. Specifically, the information processing device 10 acquires shape information from the schedule management device 40. The shape information indicates an assumed shape of a transition line that represents transition in the amount of supplied power in a target period. Further, the information processing device 10 establishes the operation schedule of the power demanding objects 20 so as to follow the assumed shape.

Figure 2:
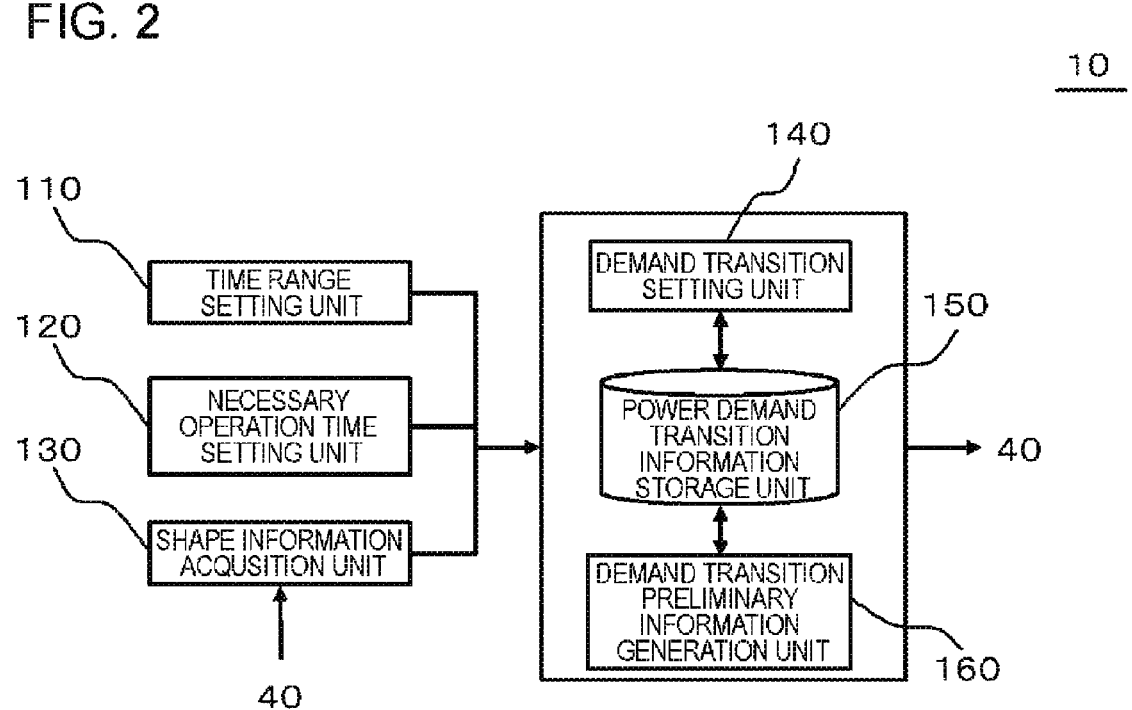
FIG. 2 is a block diagram illustrating a functional configuration of the information processing device.

FIG. 2 is a block diagram illustrating a functional configuration of the information processing device 10. The information processing device 10 includes a time range setting unit 110, a necessary operation time setting unit 120, a shape information acquisition unit 130, a demand transition setting unit 140, a power demand transition information storage unit 150, and a demand transition preliminary information generation unit 160. The time range setting unit 110 sets an operation startable time point at which an operation can be started and a target operation end time point which is the latest time point among time points at which the operation is to be ended, with respect to each of the plural power demanding objects 20. The necessary operation time setting unit 120 sets a necessary operation time with respect to each of the plural power demanding objects 20. The necessary operation time corresponds to a length of a time period during which the operation is to be performed by the power demanding object 20, which is equal to or shorter than a time period from the operation startable time point to the target operation end time point. The shape information acquisition unit 130 acquires the shape information from the schedule management device 40. Further, the demand transition setting unit 140 sets power demand transition information indicating transition in an electric energy demand in the target period so that the necessary operation time is obtained and so that the transition in the electric energy demand generated by the plural power demanding objects 20 being operated accords with the assumed shape. The target period corresponds to a partial time zone of a day, for example. The partial time zone is a time zone in which power demand is concentrated, for example, and is a time zone in which power generation based on renewable energy is efficiently performed. Further, the demand transition setting unit 140 updates the power demand transition information when the shape information acquired by the shape information acquisition unit 130 is updated.

The power demand transition information storage unit 150 stores the power demand transition information before being updated and the power demand transition information after being updated, determined by the demand transition setting unit 140. Further, the demand transition preliminary information generation unit 160 generates power demand transition preliminary information based on the power demand transition information before being updated and the power demand transition information after being updated, stored in the power demand transition information storage unit 150. The power demand transition preliminary information is used when the power demand transition information is further updated.

The information processing device 10 determines the power demand transition information so as to follow the shape information indicating the assumed shape of the transition line that represents the transition in the amount of supplied power. Accordingly, it is possible to easily determine the power demand transition information such that the supply-demand balance is stabilized. Further, the demand transition preliminary information generation unit 160 generates the power demand transition preliminary information. The power demand transition preliminary information is determined based on the power demand transition information before being updated and the power demand transition information after being updated. Thus, by using the power demand transition preliminary information, it is possible to easily update the power demand transition information.

Second Exemplary Embodiment

Figure 3:
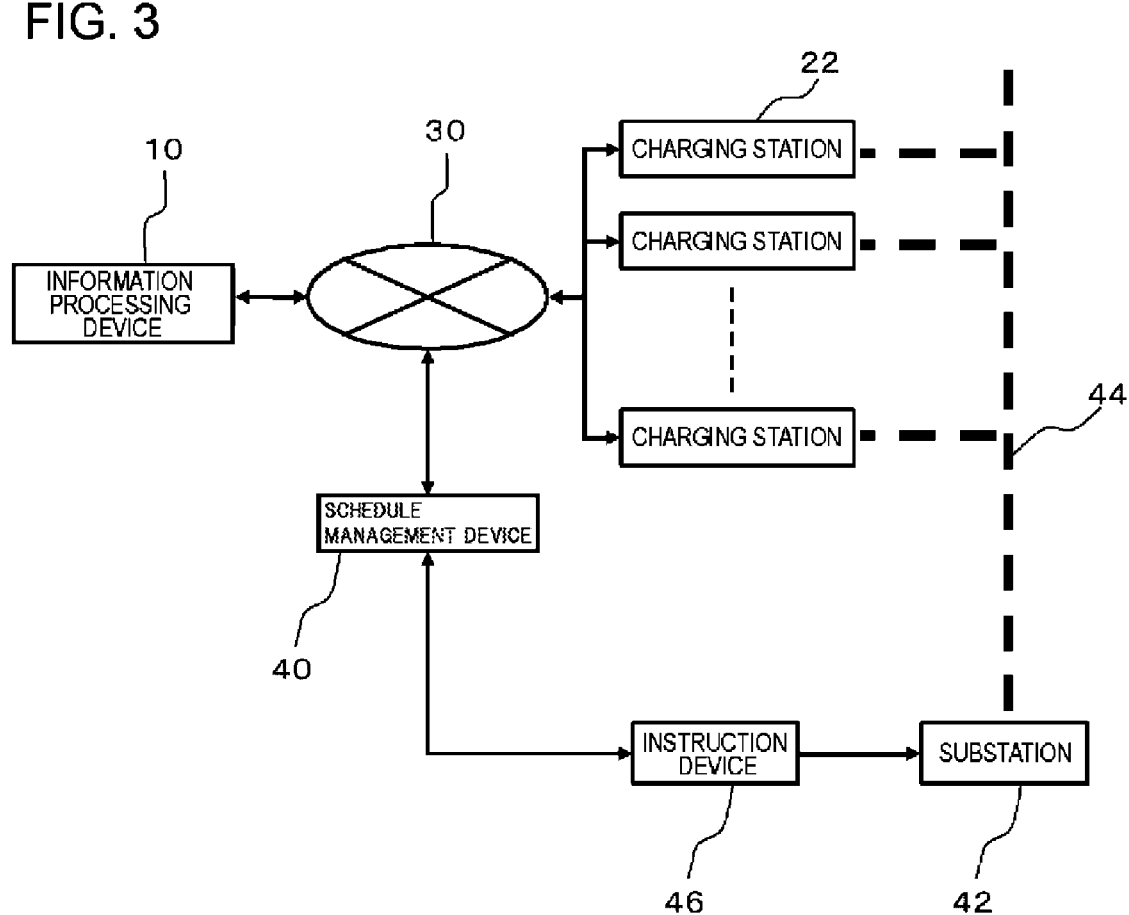
FIG. 3 is a diagram illustrating a usage environment of an information processing device according to a second exemplary embodiment.

FIG. 3 is a diagram illustrating a usage environment of an information processing device 10 according to a second exemplary embodiment. The information processing device 10 according to this exemplary embodiment is connected to plural charging stations 22 and the schedule management device 40 through the communication network 30. Each of the plural charging stations 22 includes a charger, and is a charging station of an electric vehicle, for example. The charging station 22 is an example of the power demanding object 20 in the first exemplary embodiment. The charging stations 22 are connected to a power network 44. Electric power supplied to the power network 44 is controlled by a substation 42. The substation 42 controls the electric power supplied to the power network 44 according to an instruction transmitted from an instruction device 46. An operation schedule of the instruction device 46 is stored in the schedule management device 40. Shape information transmitted to the information processing device 10 is determined based on the operation schedule of the instruction device 46.

In the example shown in this figure, the information processing device 10 and the schedule management device 40 are connected to each other through the communication network 30, but the information processing device 10 and the schedule management device 40 may be connected to each other through a dedicated line. Further, the information processing device 10 and the schedule management device 40 may be configured as a single computer.

Figure 4:
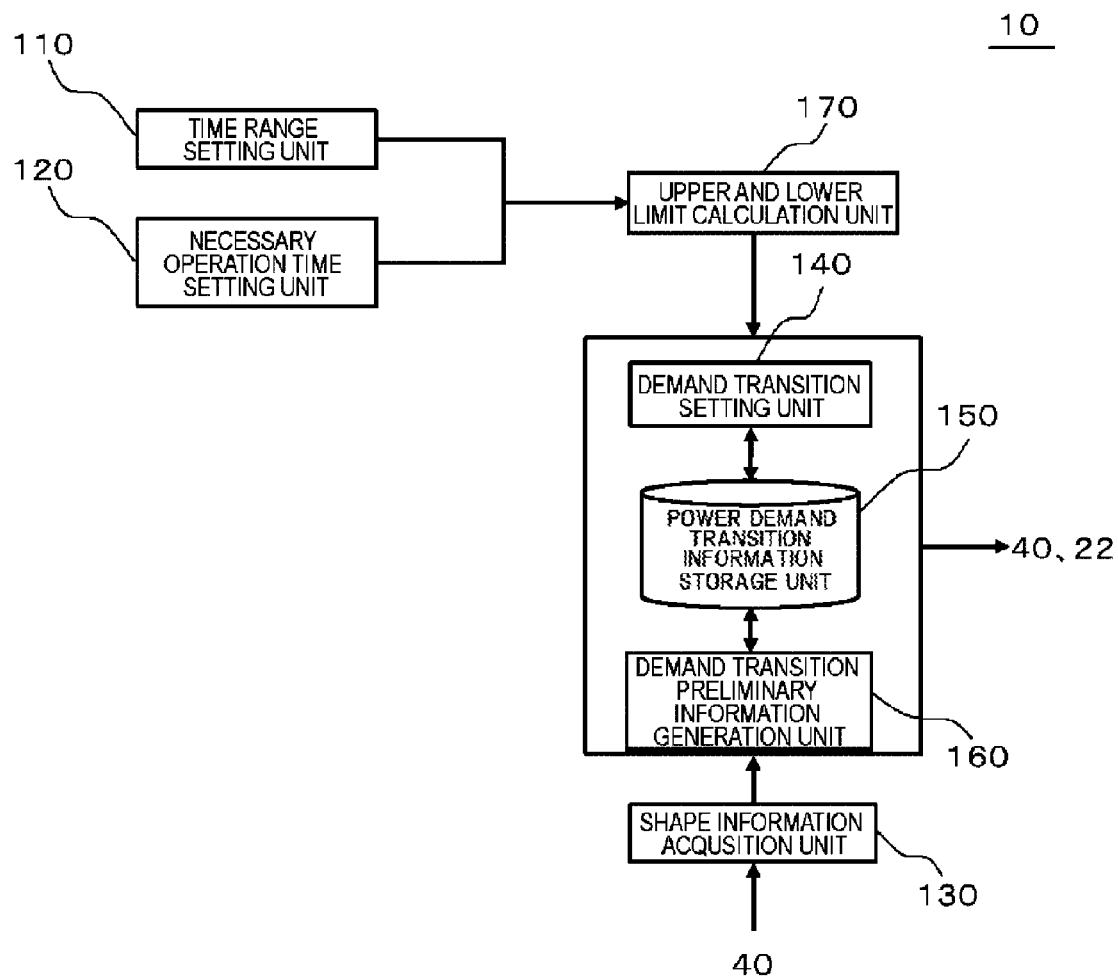
FIG. 4 is a block diagram illustrating a functional configuration of the information processing device according to the second exemplary embodiment.

FIG. 4 is a block diagram illustrating a functional configuration of the information processing device 10 according to this exemplary embodiment. The information processing device 10 according to this exemplary embodiment has the same configuration as that of the information processing device 10 according to the first exemplary embodiment except for the following points.

First, the information processing device 10 includes an upper and lower limit calculation unit 170. The upper and lower limit calculation unit 170 calculates a maximum electric energy demand and a minimum electric energy demand using a necessary operation time, an operation startable time point, and a target operation end time point. The maximum electric energy demand refers to an electric energy demand in the target period in a case where a time zone included in the target period among time zones in which the charging station 22 is operated is set to be the longest, for each of the plurality of the charging stations 22. In contrast, the minimum electric energy demand refers to an electric energy demand in the target period in a case where a time zone included in the target period among time zones in which the charging station 22 is operated is set to be the shortest, for each of the plurality of the charging stations 22. In other words, the maximum electric energy demand is an electric energy demand in a case where operation times of the charging stations 22 (that is, charging timings of electric vehicles) are included in the target period as much as possible, in the all charging stations 22. Further, the minimum electric energy demand is an electric energy demand in a case where the operation times of the charging stations 22 (that is, the charging timings of the electric vehicles) are included in the target period as little as possible, in the all charging stations 22.

Further, the demand transition setting unit 140 sets first power demand transition information so that the maximum electric energy demand can be obtained within the target period, and sets second power demand transition information so that the minimum electric energy demand can be obtained within the target period. The calculated first power demand transition information and second power demand transition information are transmitted to the schedule management device 40.

The first power demand transition information is based on a maximum value of electric energy that can be stored by the plural charging stations 22 within the target period, and the second power demand transition information is based on electric energy which should be stored by the plural charging stations 22 within the target period. Thus, a power supply schedule to the power network 44 becomes a realistic schedule as long as the power supply schedule is included in a region between the first power demand transition information and the second power demand transition information.

Further, the information processing device 10 calculates an operation schedule of the plural charging stations 22 when calculating the first power demand transition information and the second power demand transition information.

The demand transition setting unit 140 of the information processing device 10 transmits the operation schedule to the plural charging stations 22.

In addition, the charging stations 22 are operated according to the received operation schedule.

Figure 5:
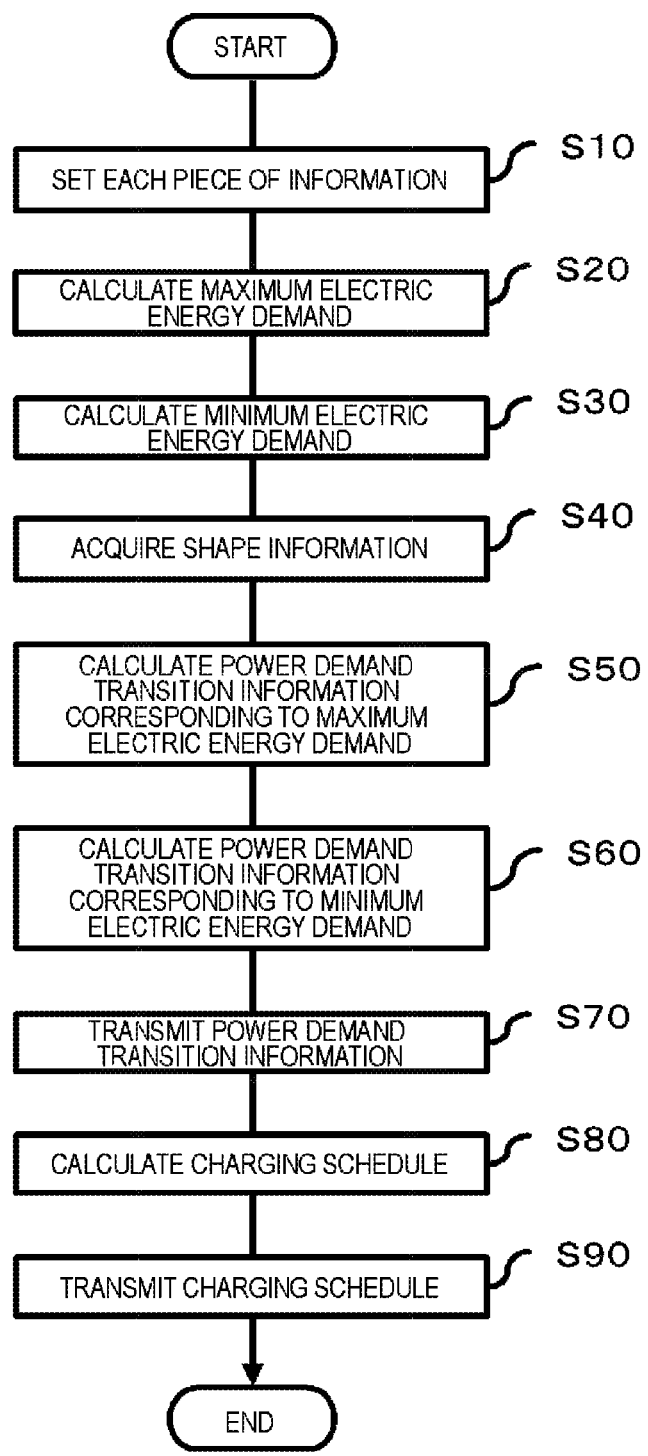
FIG. 5 is a flowchart illustrating a first example of an operation of the information processing device according to the second exemplary embodiment.

FIG. 5 is a flowchart illustrating a first example of the operation of the information processing device 10 according to this exemplary embodiment. The flowchart shown in this figure shows a process when the information processing device 10 first calculates power demand transition information. First, the time range setting unit 110 of the information processing device 10 sets an operation startable time point and a target operation end time point of each of the plural charging stations 22. Further, the necessary operation time setting unit 120 sets necessary operation times of the plural charging stations 22 (step S10).

Specifically, the operation startable time point, the target operation end time point, and the necessary operation time are calculated based on each operation history of the charging stations 22, for example. The operation history at least includes a time point at which a rechargeable battery is connected to a charger (a plug-in time point), a time point at which the rechargeable battery is separated from the charger (a plug-out time point), and a free capacity up to full charging at the start of charging. The operation startable time point is an average time point of plug-in time points, for example, and the target operation end time point is an average time point of plug-out time points, for example. Further, the necessary operation time is set based on the free capacity. A calculation process of the operation startable time point, the target operation end time point, and the necessary operation time may be performed in the charging stations 22, or may be performed in the information processing device 10. In the latter case, the charging station 22 transmits data indicating the operation history to the information processing device 10. The information processing device 10 stores the received data.

Then, the upper and lower limit calculation unit 170 calculates the maximum electric energy demand (step S20), and calculates the minimum electric energy demand (step S30).

The shape information acquisition unit 130 acquires shape information from the schedule management device 40 (step S40).

Further, the demand transition setting unit 140 sets the first power demand transition information so that the maximum electric energy demand can be obtained within the target period (step S50). Further, the demand transition setting unit 140 sets the second power demand transition information so that the minimum electric energy demand can be obtained within the target period (step S60). Then, the demand transition setting unit 140 stores the first power demand transition information and the second power demand transition information in the power demand transition information storage unit 150.

Further, the demand transition setting unit 140 transmits the first power demand transition information and the second power demand transition information to the schedule management device 40 (step S70).

Then, the demand transition setting unit 140 calculates a charging schedule (a first charging schedule) corresponding to the first power demand transition information, of each of the plural charging stations 22. Further, the demand transition setting unit 140 calculates a charging schedule (a second charging schedule) corresponding to the second power demand transition information, of each of the plural charging stations 22 (step S80). Further, the demand transition setting unit 140 transmits, to each of the plural charging stations 22, the first charging schedule and the second charging schedule of the charging station 22 (step S90).

Details about the processes between steps S20 to S60 and the process in step S80 will be described later.

Figure 6:
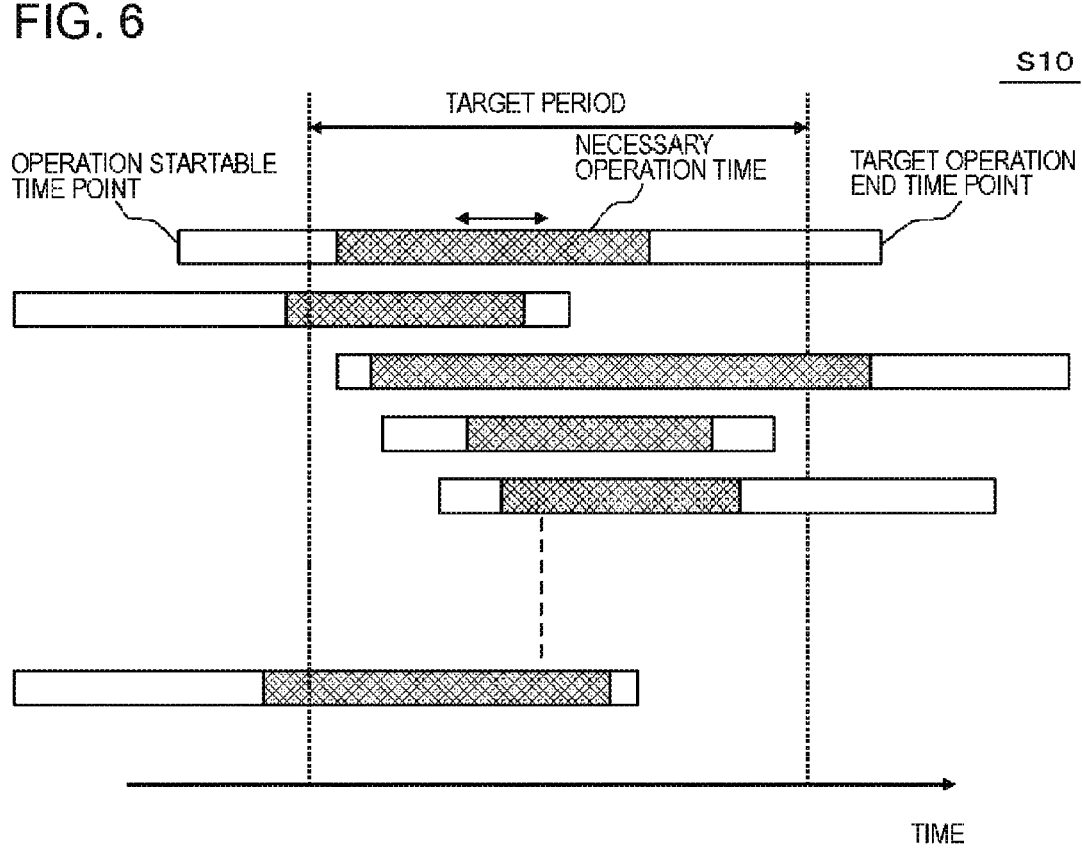
FIG. 6 is a diagram illustrating an example of a relationship between an operation startable time point, a target operation end time point, a necessary operation time, and a target period.

FIG. 6 shows an example of a relationship between the operation startable time point, the target operation end time point, the necessary operation time, and the target period. The information processing device 10 acquires such information in step S10 in FIG. 5.

Generally, the necessary operation time may be shorter than a time period from the operation startable time point to the target operation end time point. Thus, a time zone in which the charger of the charging station 22 is operated is freely movable to some extent between the operation startable time point and the target operation end time point. Further, the time zone may be divided into plural sections, and a part thereof may be set as a time zone in which the charger of the charging station 22 is operated.

Figure 7:
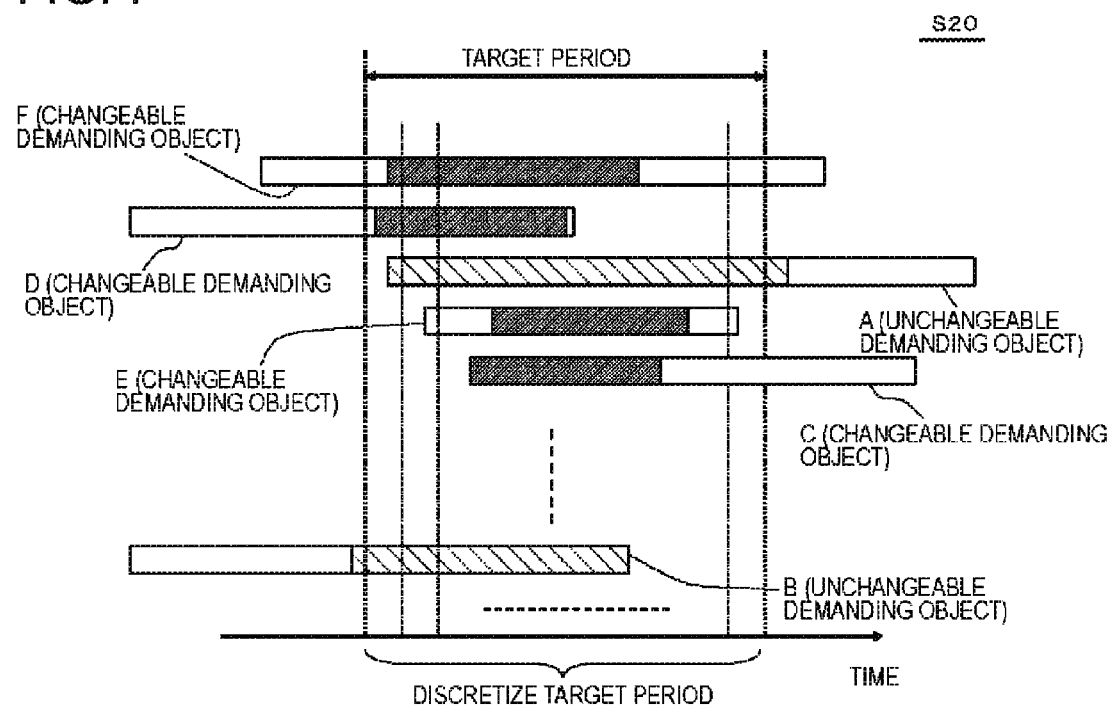
FIG. 7 is a diagram illustrating a calculation process (step S20 in FIG. 5) of a maximum electric energy demand.

FIG. 7 is a diagram illustrating a calculation process (step S20 in FIG. 5) of the maximum electric energy demand. As described above, the time zone in which the charger of the charging station 22 is operated is freely movable to some extent between the operation startable time point and the target operation end time point. Further, the time zone may be divided into plural sections, and a part thereof may be set as a time zone in which the charger of the charging station 22 is operated. The demand transition setting unit 140 sets the time zone in which the charger of the charging station 22 is operated so that the time zone in which the charger of the charging station 22 is operated is included in the target period as much as possible. The setting includes a case where a specific time zone is divided into plural sections and a part thereof is set as a time zone in which the charger of the charging station 22 is operated.

For example, in a case where the operation startable time point is within the target period, the target operation end time point is out of the target period, and the time period from the operation startable time point to the end time point of the target period is shorter than the necessary charging time, the demand transition setting unit 140 sets a time point at which the operation of the charger of the charging station 22 is started as the operation startable time point (example A in FIG. 7). In this case, the operation end time point of the charger of the charging station 22 is later than the target period. Further, the operation schedule of the charging station 22 does not have a degree of freedom, and is uniquely determined (unchangeable demanding object).

Further, in a case where the operation startable time point is out of the target period, the target operation end time point is within the target period, and the time period from the starting time point of the target period to the target operation end time point is shorter than the necessary charging time, the demand transition setting unit 140 sets a time point at which the operation of the charger of the charging station 22 is ended as the target operation end time point (example B in FIG. 7). In this case, the operation end time point of the charger of the charging station 22 is later than the target period. Further, the operation schedule of the charging station 22 does not have a degree of freedom, and is uniquely determined (unchangeable demanding object).

Further, in a case where the operation startable time point is within the target period, the target operation end time point is out of the target period, and the time period from the operation startable time point to the end time point of the target period is longer than the necessary charging time, the setting of the charging time zone in the demand transition setting unit 140 has a degree of freedom (example C in FIG. 7). That is, the operation schedule of the charging station 22 has a degree of freedom (changeable demanding object). The degree of freedom lies between a case where a starting time point of the operation of the charger of the charging station 22 becomes the operation startable time point (that is, a case where a charging time is shifted to the leftmost side in the figure) and a case where an end time point of the operation of the charger of the charging station 22 becomes an end time point of the target period.

Further, in a case where the operation startable time point is out of the target period, the target operation end time point is within the target period, and the time period from the starting time point of the target period to the target operation end time point is longer than the necessary charging time, the setting of the charging time zone in the demand transition setting unit 140 has a degree of freedom (example D in FIG. 7). That is, the operation schedule of the charging station 22 has a degree of freedom (changeable demanding object). The degree of freedom lies between a case where the starting time point of the operation of the charger of the charging station 22 becomes the starting time point of the target period and a case where the end time point of the operation of the charger of the charging station 22 becomes the target operation end time point (that is, a case where the charging time is shifted to the rightmost side in the figure).

Further, in a case where both of the operation startable time point and the target operation end time point are within the target period, and the necessary operation time is shorter than the time period from the operation startable time point to the target operation end time point, the setting of the charging time zone in the demand transition setting unit 140 has a degree of freedom (example E in FIG. 7). That is, the operation schedule of the charging station 22 has a degree of freedom (changeable demanding object). The degree of freedom lies between a case where the starting time point of the operation of the charger of the charging station 22 becomes the operation startable time point and a case where the end time point of the operation of the charger of the charging station 22 becomes the target operation end time point (that is, a case where the charging time is shifted to the rightmost side in the figure).

Further, in a case where both of the operation startable time point and the target operation end time point are out of the target period, and the necessary operation time is shorter than the target period, the setting of the charging time zone in the demand transition setting unit 140 has a degree of freedom (example F in FIG. 7). That is, the operation schedule of the charging station 22 has a degree of freedom (changeable demanding object). The degree of freedom lies between a case where the starting time point of the operation of the charger of the charging station 22 becomes the starting time point of the target period and a case where the end time point of the operation of the charger of the charging station 22 becomes the end time point of the target period (that is, a case where the charging time is shifted to the rightmost side in the figure).

Further, the demand transition setting unit 140 adjusts the operation schedule of the charging station 22 which is the changeable demanding object in the calculation process (step S50) of the first power demand transition information. Here, the demand transition setting unit 140 divides the target period in a predetermined time unit (discretization). The time unit is sufficiently small with respect to a time period necessary for switching on/off of the charger of the charging station 22. Step S50 will be described later.

Figure 8:
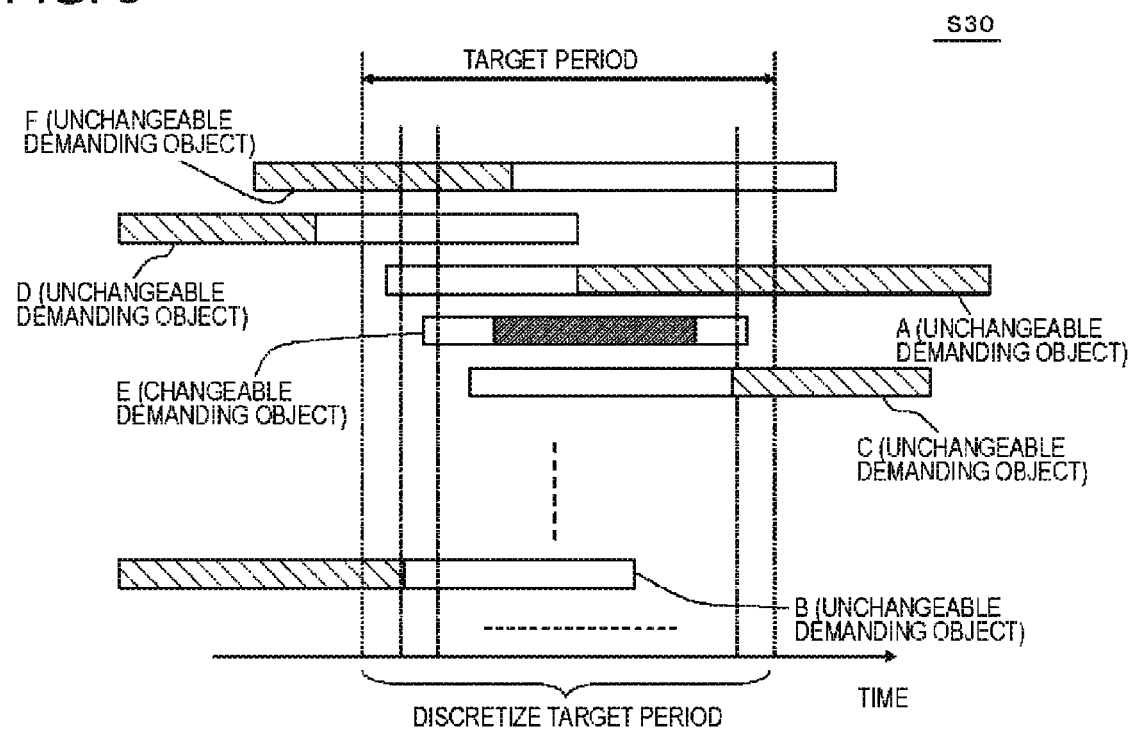
FIG. 8 is a diagram illustrating a calculation process (step S30 in FIG. 5) of a minimum electric energy demand.

FIG. 8 is a diagram illustrating the calculation process (step S30 in FIG. 5) of the minimum electric energy demand. As described above, the time zone in which the charger of the charging station 22 is operated is freely movable to some extent between the operation startable time point and the target operation end time point. The demand transition setting unit 140 sets the time zone in which the charger of the charging station 22 is operated so that the time zone in which the charger of the charging station 22 is operated is included in the target period as little as possible.

For example, in a case where the operation startable time point is out of the target period, the demand transition setting unit 140 sets a time point at which the operation of the charger of the charging station 22 is started as the operation startable time point (examples B, D and F in FIG. 8). In this case, the operation schedule of the charging station 22 does not have a degree of freedom, and is uniquely determined (unchangeable demanding object).

Further, in a case where the target operation end time point is out of the target period, the demand transition setting unit 140 sets a time point at which the operation of the charger of the charging station 22 is ended as the target operation end time point (examples A and C in FIG. 8). In this case, similarly, the operation schedule of the charging station 22 does not have a degree of freedom, and is uniquely determined (unchangeable demanding object).

Further, in a case where both of the operation startable time point and the target operation end time point are within the target period, and the necessary operation time is shorter than the time period from the operation startable time point to the target operation end time point, the setting of the charging time zone in the demand transition setting unit 140 has a degree of freedom (example E in FIG. 8). That is, the operation schedule of the charging station 22 has a degree of freedom (changeable demanding object). The degree of freedom lies between a case where the starting time point of the operation of the charger of the charging station 22 becomes the operation startable time point (that is, a case where the charging time is shifted to the leftmost side in the figure) and a case where the end time point of the operation of the charger of the charging station 22 becomes the target operation end time point (that is, a case where the charging time is shifted to the rightmost side in the figure).

Further, the demand transition setting unit 140 adjusts the operation schedule of the charging station 22 which is the changeable demanding object in the calculation process (step S60) of the second power demand transition information. Here, the demand transition setting unit 140 divides the target period in a predetermined time unit (discretization). Step S60 will be described later. The time unit is sufficiently small with respect to a time period necessary for switching on/off of the charger of the charging station 22.

Figure 9:
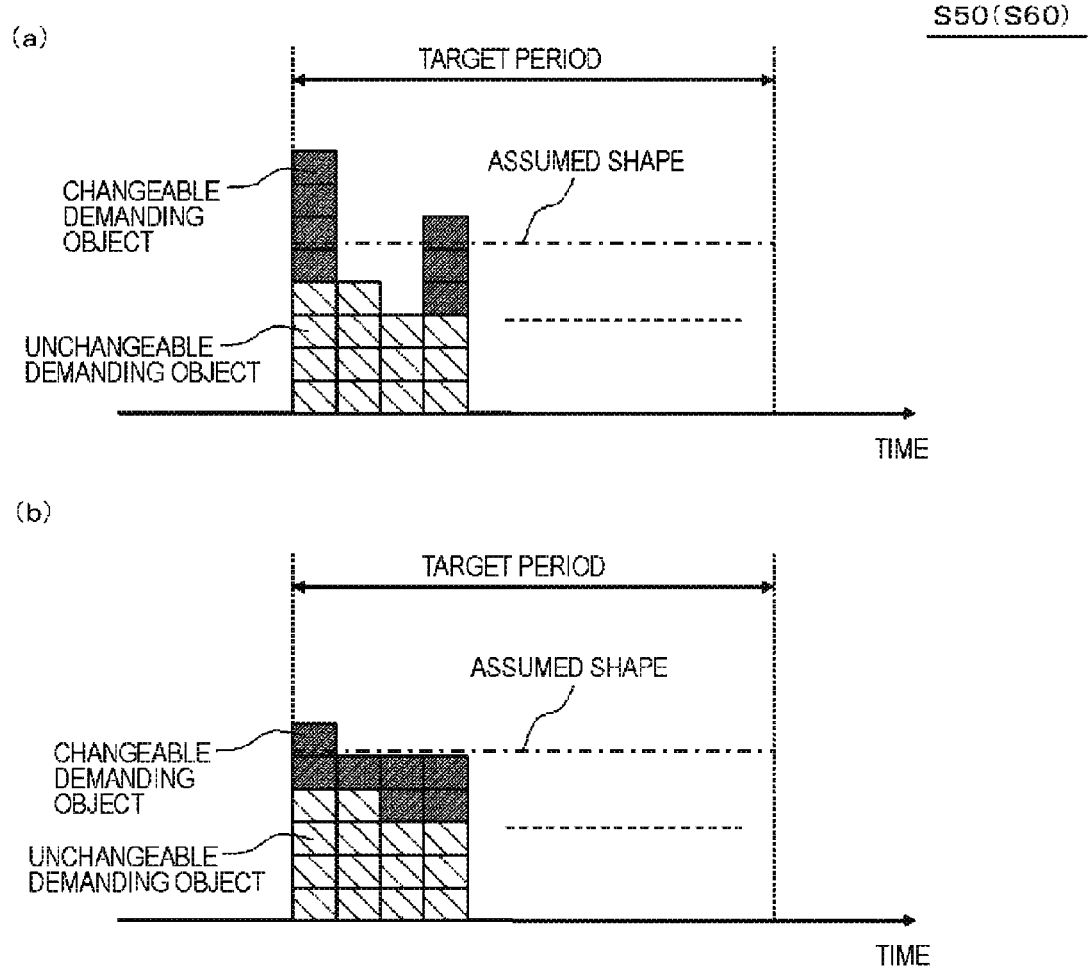
FIG. 9 are diagrams illustrating a first example of details of steps S50 and S60 in FIG. 5.

FIG. 9 is a diagram illustrating a first example of details of steps S50, S60, and S80 in FIG. 5. The example shown in FIG. 9 represents a case where a transition line is a straight line (that is, a case where the amount of supplied power is constant on a time axis). As described above, the demand transition setting unit 140 divides the target period in a predetermined time unit Δt. The demand transition setting unit 140 moves the charging time zone of the changeable demanding object. Thus, as shown in FIG. 9 (b), the power demand due to the changeable demanding object shifts on the time axis. The demand transition setting unit 140 repeats this process so that the power demand is close to a target value. Further, as a result of this process, an operation schedule for all the charging stations 22 is set.

The process shown in FIG. 9 is performed with respect to each of the maximum electric energy demand and minimum electric energy demand. As a result, the first power demand transition information and the second power demand transition information are calculated.

Figure 10:
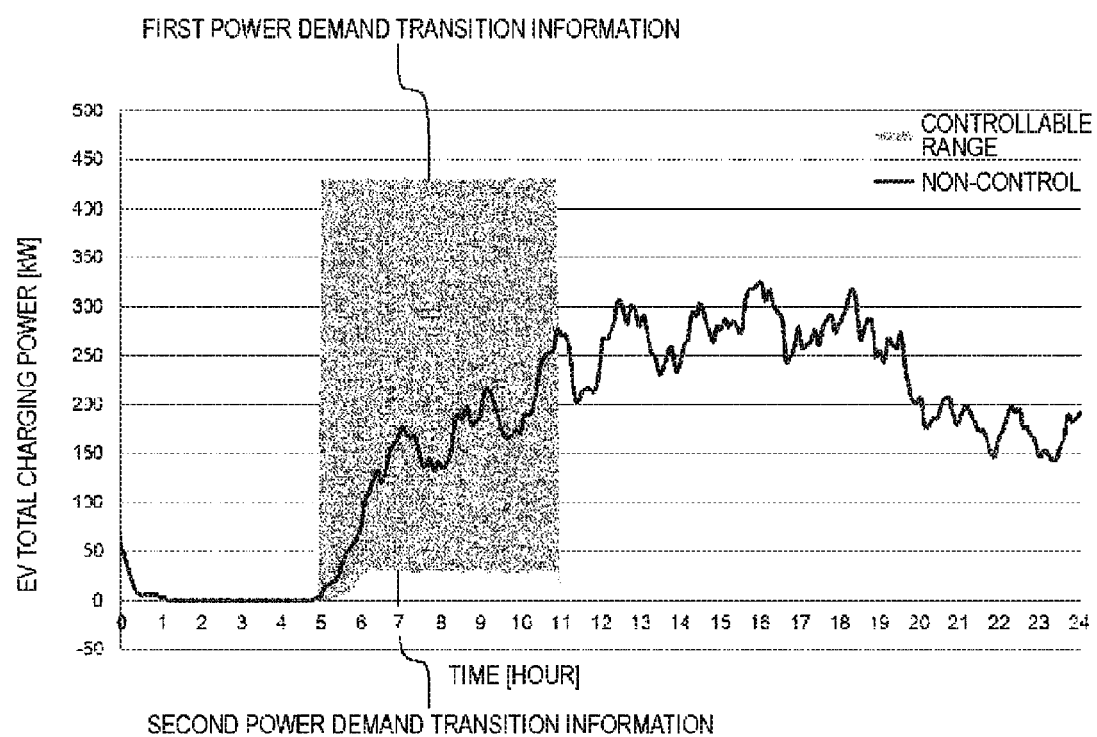
FIG. 10 is a diagram illustrating results of processes shown in FIG. 9.
Figure 11:
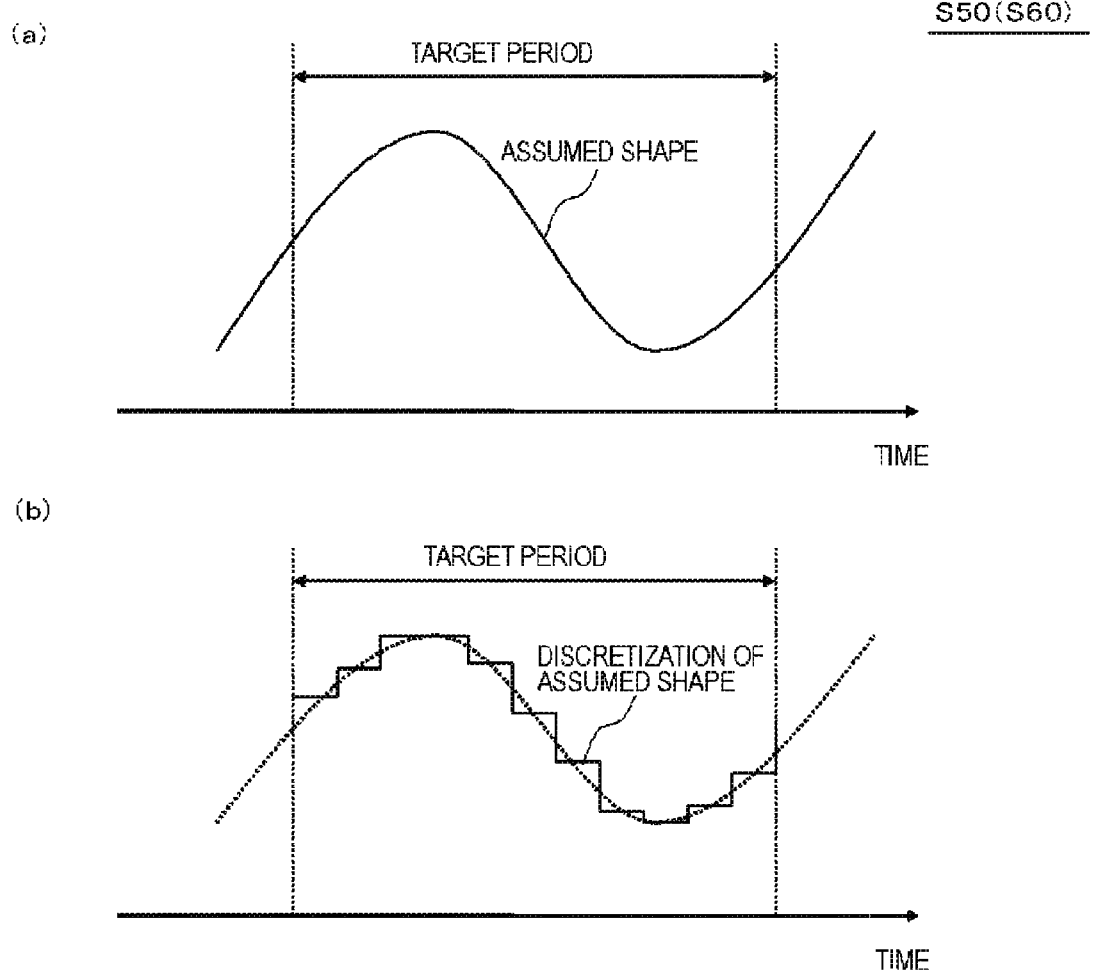
FIG. 11 are diagrams illustrating a second example of details of steps S50 and S60 in FIG. 5.

FIG. 10 is a diagram illustrating the result of the process shown in FIG. 9. The power demand schedule in the power network 44 is set to be included in a region between the first power demand transition information and the second power demand transition information.

FIGS. 11 to 14 are diagrams illustrating a second example of details of steps S50, S60, and S80 in FIG. 5. The example shown in these figures represents a case where an assumed shape (transition line) is a curved line as shown in FIG. 11(a) and is represented as a function (a first function). First, as shown in FIG. 11(b), the demand transition setting unit 140 divides the assumed shape in the time unit Δt for discretization using the first function.

Figure 12:
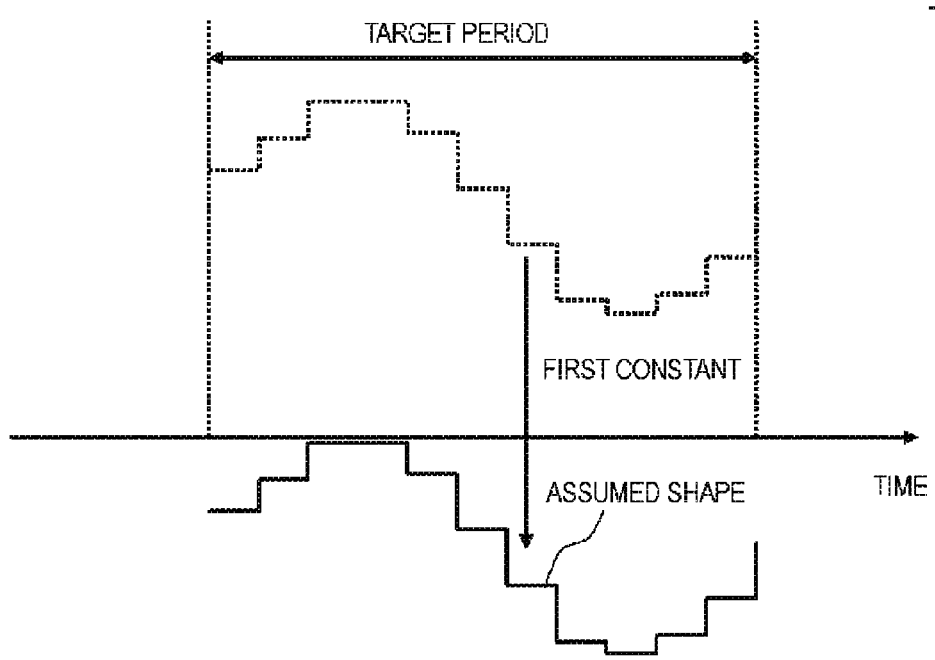
FIG. 12 is a diagram illustrating the second example of details of steps S50 and S60 in FIG. 5.

Then, as shown in FIG. 12, the demand transition setting unit 140 adds a negative first constant to the discretized first function. Here, the demand transition setting unit 140 sets the first constant so that the first function is smaller than zero over the entire target period. Specifically, the first constant is a value obtained by multiplying a maximum value of the first function in the target period by −1, or is a value increased in the negative direction compared with the obtained value.

Figure 13:
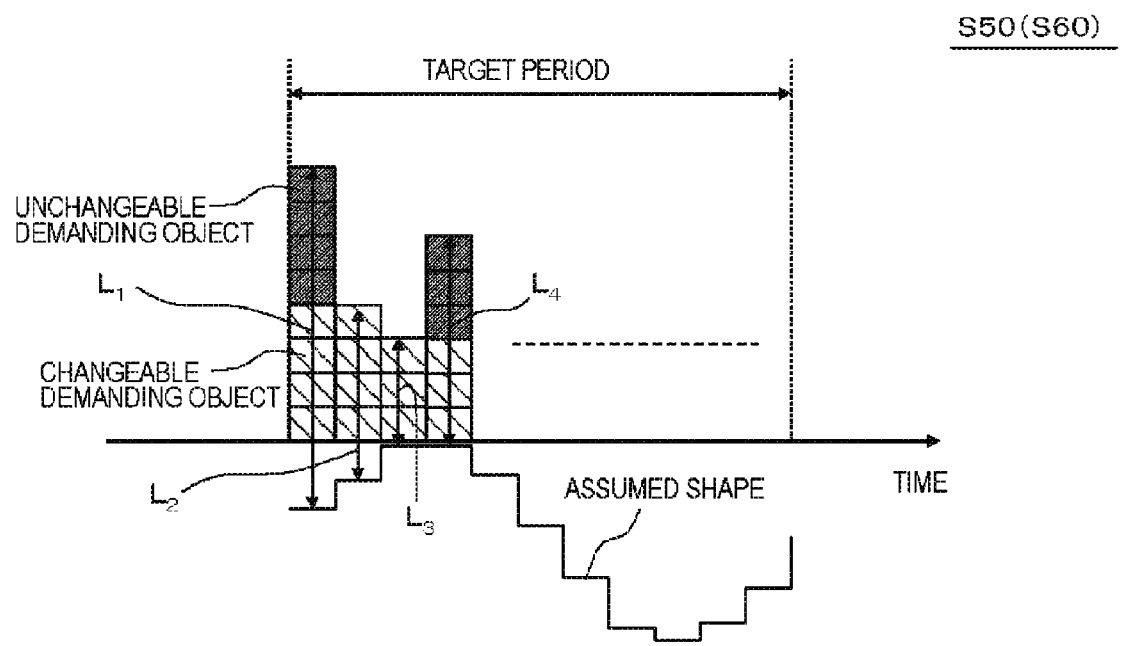
FIG. 13 is a diagram illustrating the second example of details of steps S50 and S60 in FIG. 5.
Figure 14:
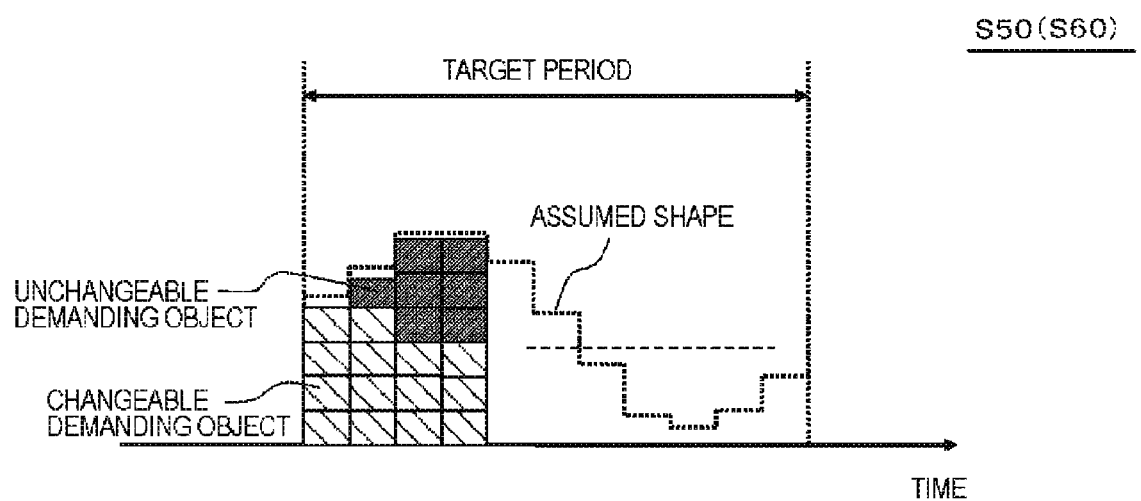
FIG. 14 is a diagram illustrating the second example of details of steps S50 and S60 in FIG. 5.

Then, as shown in FIGS. 13 and 14, the demand transition setting unit 140 sets the power demand transition information so that the sum of squares of differences between the first function and the power demand transition information becomes minimum. Specifically, the demand transition setting unit 140 calculates a difference $L_t$ between the first function indicating the assumed shape and the power demand transition information in each discretized section. Further, the demand transition setting unit 140 sets the power demand transition information so that the sum of squares of the differences $L_t$ becomes minimum. This process is represented as an expression as follows.

$$\text{Min}: \Sigma(W(t)-f'(t))^2$$

Here, W(t) represents a discretized function (a second function) indicating power demand transition information, and f'(t) represents a first function after the first constant is added. Further, $\Sigma(W(t)-f'(t))$ becomes $L_t$.

Figure 15:
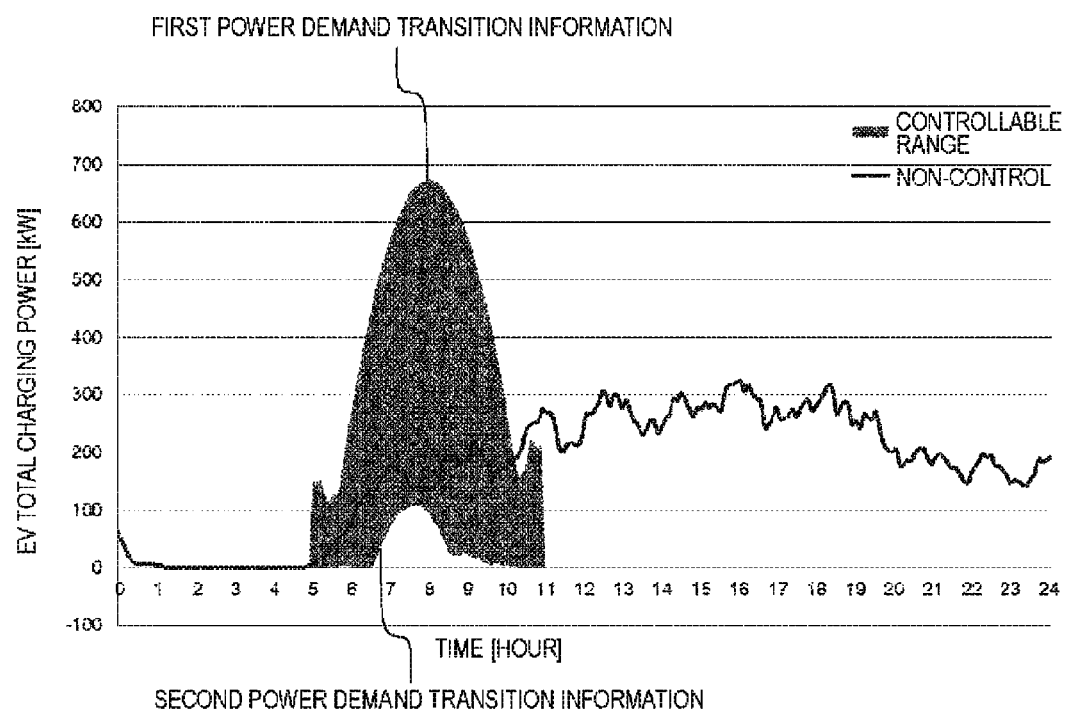
FIG. 15 is a diagram illustrating results of processes shown in FIGS. 11 to 14.

FIG. 15 is a diagram illustrating results of the processes shown in FIGS. 11 to 14. In this figure, the power supply schedule to the power network 44 is set to be included in the region between the first power demand transition information and the second power demand transition information.

Figure 16:
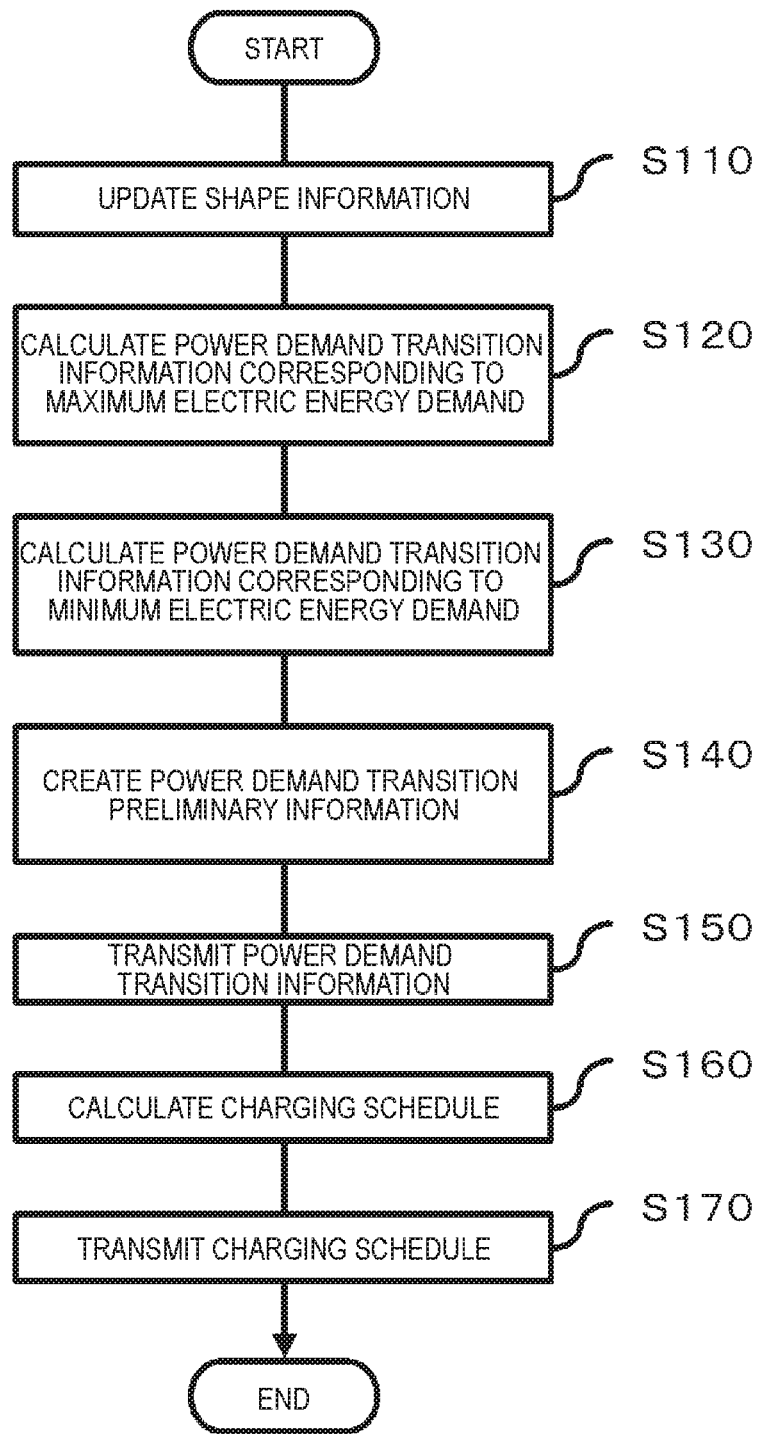
FIG. 16 is a flowchart illustrating a second example of the operation of the information processing device.

FIG. 16 is a flowchart illustrating a second example of the operation of the information processing device 10. The flowchart shown in this figure shows a process when the information processing device 10 first updates power demand transition information. In this step, since the demand transition preliminary information generation unit 160 does not generate power demand transition preliminary information, the information processing device 10 performs the same process as the process shown in FIG. 5, to thereby update the power demand transition information.

Specifically, if the shape information acquisition unit 130 acquires new shape information (step S110), the demand transition setting unit 140 sets the first power demand transition information again (step S120), and sets the second power demand transition information again (step S130). Details about the processes performed in steps S120 and S130 are the same as the processes performed in step S50 and S60 in FIG. 5. Further, the demand transition setting unit 140 stores the updated first power demand transition information and second power demand transition information in the power demand transition information storage unit 150.

Then, the demand transition preliminary information generation unit 160 generates power demand transition preliminary information using the first power demand transition information before being updated and the first power demand transition information after being updated, stored in the power demand transition information storage unit 150 (step S140). The demand transition preliminary information generation unit 160 sets the sum of a function obtained by multiplying the power demand transition information after being updated by a first coefficient and a function obtained by multiplying the power demand transition information before being updated by a second coefficient as the power demand transition preliminary information. Here, the first coefficient and the second coefficient are variables. Accordingly, for example, a user of the information processing device 10 or the schedule management device 40 adjusts the first coefficient and the second coefficient, respectively, to thereby make it possible to cause the power demand transition preliminary information to have a desired shape. Further, the demand transition preliminary information generation unit 160 stores the generated power demand transition preliminary information in the power demand transition information storage unit 150.

Then, the demand transition setting unit 140 transmits the first power demand transition information and the second power demand transition information to the schedule management device 40 (step S150).

Then, the demand transition setting unit 140 calculates a first charging schedule of each of the plural charging stations 22, again. Further, the demand transition setting unit 140 calculates a second charging schedule of each of the plural charging stations 22, again (step S160). Further, the demand transition setting unit 140 transmits, to each of the plural charging stations 22, the first charging schedule and the second charging schedule of the charging station 22, again (step S170).

Figure 17:
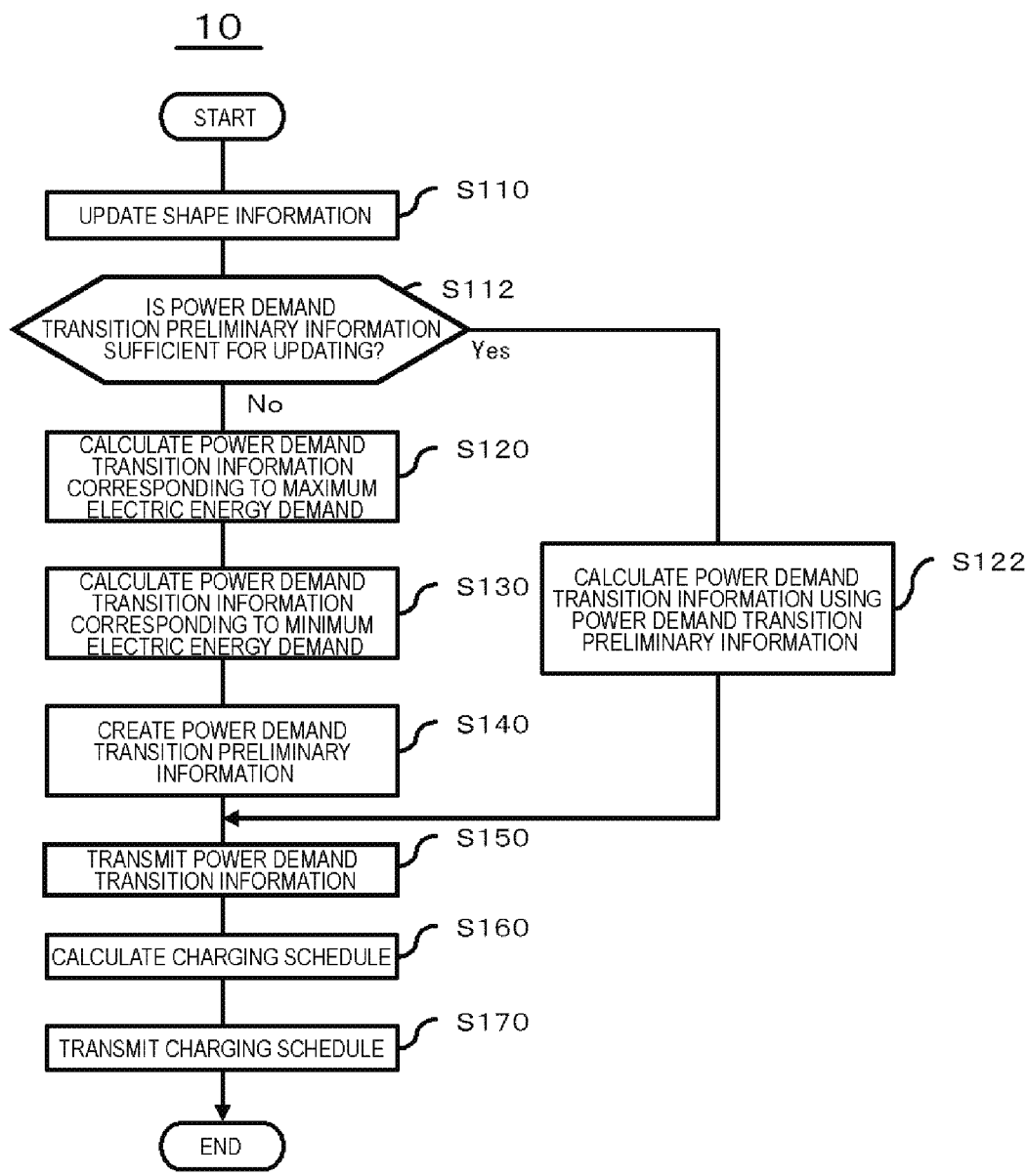
FIG. 17 is a flowchart illustrating a third example of the operation of the information processing device.

FIG. 17 is a flowchart illustrating a third example of the operation of the information processing device 10. The flowchart shown in this figure represents a process when the information processing device 10 further updates the power demand transition information again (that is, in a case where the number of times of updating is equal to or greater than two).

If the shape information acquisition unit 130 acquires the new shape information (step S110), the demand transition setting unit 140 reads the first power demand transition preliminary information and the second power demand transition preliminary information. Further, the demand transition setting unit 140 determines whether or not the first power demand transition information and the second power demand transition information can be updated using the first power demand transition preliminary information and the second power demand transition preliminary information (step S112). For example, in a case where a difference between the initial shape information or the next shape information and the newly acquired shape information is equal to or smaller than a reference value, the demand transition setting unit 140 determines that the power demand transition information can be updated using the power demand transition preliminary information. In this case, the demand transition setting unit 140 stores, whenever shape information is received, the received shape information in the power demand transition information storage unit 150. Details about the determination performed by the demand transition setting unit 140 are not limited to this example.

In a case where it is determined that the power demand transition information can be updated using the power demand transition preliminary information (Yes in step S112), the demand transition setting unit 140 generates the first power demand transition information and second power demand transition information after being updated, using the first power demand transition preliminary information and the second power demand transition preliminary information (step S122).

Specifically, the demand transition setting unit 140 compares the shape of the first power demand transition information with the shape information while changing the first coefficient and the second coefficient under the condition that the sum of the first coefficient and the second coefficient is smaller than 1. Further, the demand transition setting unit 140 sets the first coefficient and the second coefficient so that a difference between the shapes is equal to or smaller than a reference value (or so that the difference becomes a minimum value). In addition, the demand transition setting unit 140 sets information obtained by substituting the determined first coefficient and second coefficient in the first power demand transition preliminary information as the first power demand transition information after being updated. The demand transition setting unit 140 calculates the second power demand transition information after being updated using the same method.

Further, in a case where it is determined that the power demand transition information cannot be updated using the power demand transition preliminary information (No in step S112), the demand transition setting unit 140 performs the processes shown in steps S120 to S140 in FIG. 16.

In addition, the demand transition setting unit 140 transmits the generated first power demand transition information and second power demand transition information to the schedule management device 40 (step S150). The subsequent processes (steps S160 and S170) are the same as the processes shown in FIG. 16.

The demand transition setting unit 140 may generate plural pieces of power demand transition information after being updated based on each of a plurality of respective combinations of the first coefficient and the second coefficient, and may transmit the result to the schedule management device 40. In this case, the user of the schedule management device 40 can select power demand transition information having a desired shape.

Further, the demand transition setting unit 140 may transmit the first power demand transition preliminary information and the second power demand transition preliminary information to the schedule management device 40 with the first coefficient and the second coefficient being used as variables. In this case, the demand transition setting unit 140 does not perform the process shown in step S122. Further, the user of the schedule management device 40 adjusts the first coefficient and the second coefficient in the first power demand transition preliminary information under the condition that the sum of the first coefficient and the second coefficient becomes 1, to thereby generate the first power demand transition information after being updated. Further, the user of the schedule management device 40 generates the second power demand transition information using the same method.

Figure 18:
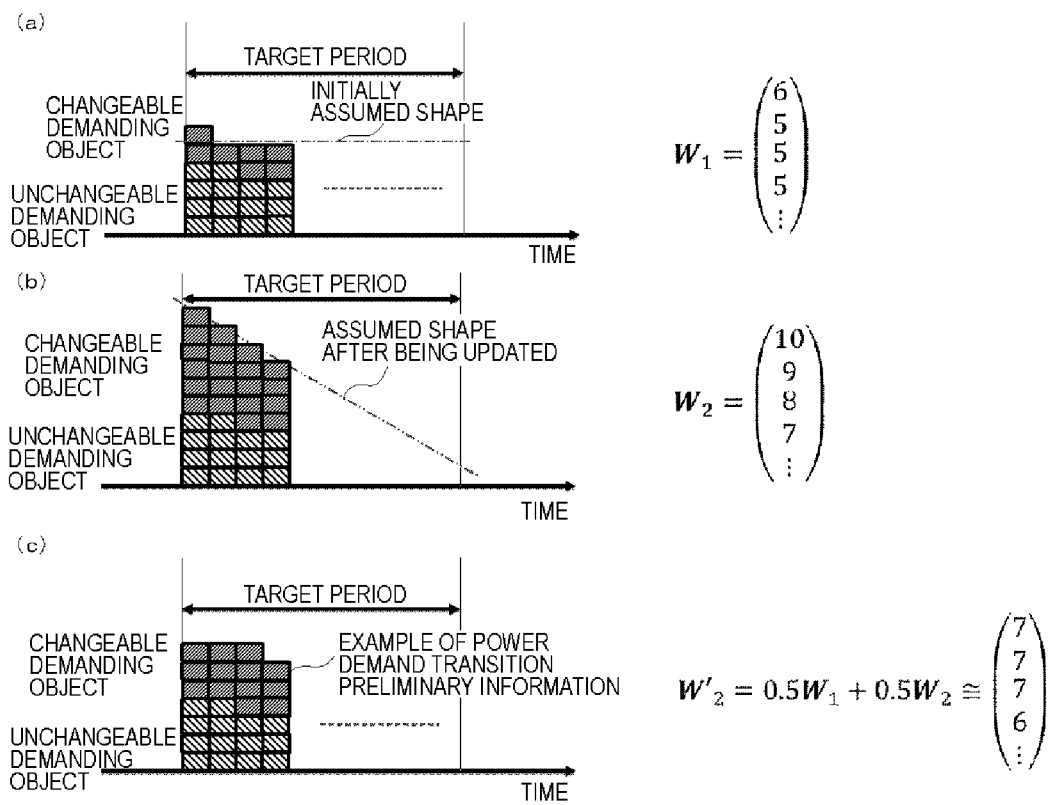
FIG. 18 are diagrams specifically illustrating an example of a method of generating power demand transition information using power demand transition preliminary information.

FIG. 18 is a diagram specifically illustrating an example of a method of generating power demand transition information using power demand transition preliminary information. Power demand transition information that is first acquired is represented as w_1(t), and power demand transition information after being first updated is represented as w2(t).

When w1(t) is discretized by time splitting, if w1(t) is expressed as a vector on an axis formed by respective time points, an expression of W1=(w_1(0), w_1(1), w_1(2), ... ) is obtained. Further, when w2(t) is discretized by time sharing, if w2(t) is expressed as a vector on an axis formed by respective time points, an expression of W2= (w_2(0), w_2(1), w_2(2), ... ) is obtained.

Here, power demand transition preliminary information W'2 is expressed as follows.

$$W'2 = \alpha \times W1 + \beta \times W2$$

Here, $\alpha$ is the above-described first coefficient, and $\beta$ is the above-described second coefficient. Further, $\alpha+\beta<1$.

FIG. 18(a) shows W1, and FIG. 18(b) shows W2. Further, FIG. 18(c) shows an example in which power demand transition preliminary information is made using $\alpha=\beta=0.5$.

In this way, if the first coefficient $\alpha$ and the second coefficient $\beta$ are variously changed, it is possible to obtain power demand transition preliminary information W'2 having various shapes.

Even in a case where n pieces of power demand transition information are previously obtained, similarly, if $W'=\alpha\_1 \cdot W\_1 + \alpha\_2 \cdot W\_2 + \alpha\_2 \cdot W\_2 + \ldots + \alpha\_n \cdot W\_n$, and $1 > \alpha\_1 + \alpha\_2 + \alpha\_3 + \ldots + \alpha\_n$, the power demand transition preliminary information can be created.

According to this exemplary embodiment described above, it is possible to acquire the same effect as in the first exemplary embodiment. Further, the first power demand transition information is based on a maximum value of electric energy that can be stored by the plural charging stations 22 within the target period, and the second power demand transition information is based on electric energy which should be stored by the plural charging stations 22 within the target period. Thus, the power supply schedule to the power network 44 is a realistic schedule as long as the power supply schedule is included in a region between the first power demand transition information and the second power demand transition information.

Further, the demand transition setting unit 140 sets the first constant so that the first function is smaller than zero in the entire target period. Thus, in the processes shown in FIGS. 13 and 14, an electric energy demand having a certain value $L_t$ becomes only a single value. Accordingly, the amount of computation of the processes shown in FIGS. 13 and 14 is reduced.

Further, in a case where the number of times of updating of the shape information exceeds two, the demand transition setting unit 140 may use power demand transition preliminary information for second updating and subsequent updating of power demand transition information. Accordingly, it is possible to reduce the amount of computation necessary for updating of the power demand transition information.

Figure 19:
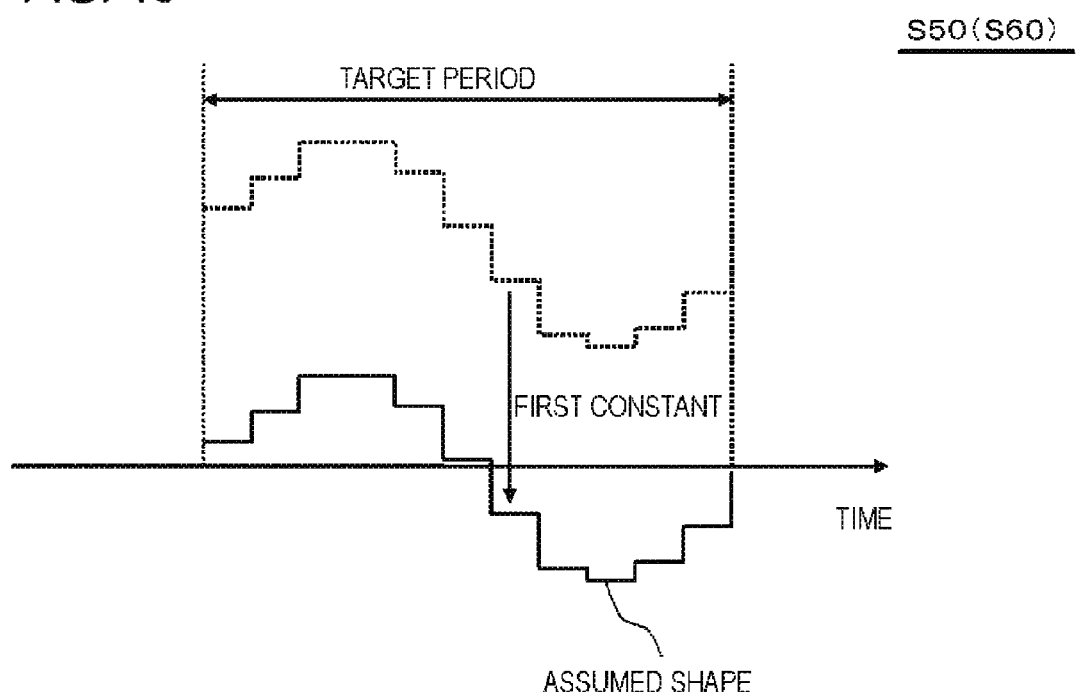
FIG. 19 is a diagram illustrating a modification example of the process shown in FIG. 12.

The first constant shown in FIG. 12 may not be a value such that the entirety of the first function becomes negative. For example, as shown in FIG. 19, the first constant may be a value such that the first function becomes negative in a certain section. In this case, similarly, the amount of computation of the processes shown in FIGS. 13 and 14 is reduced.

Further, the operation startable time point, the target operation end time point, and the necessary operation time may be calculated using day-of-the-week information, month information, humidity, battery temperature, and rechargeable battery type information (for example, vehicle type information), in addition to the operation history of each charging station 22.

Third Exemplary Embodiment

Figure 20:
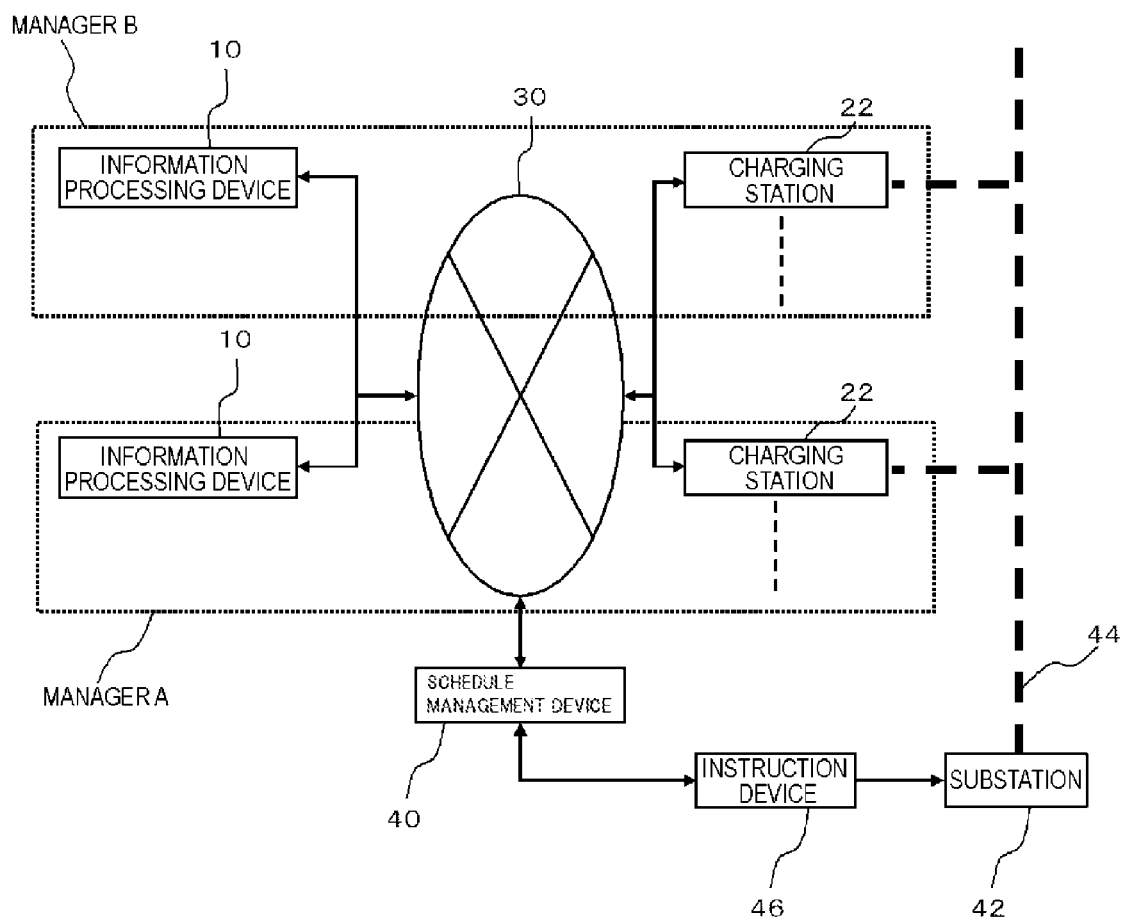
FIG. 20 is a diagram illustrating a usage environment of an information processing device according to a third exemplary embodiment.

FIG. 20 is a diagram illustrating a usage environment of an information processing device 10 according to a third exemplary embodiment. This exemplary embodiment is the same as the usage environment of the information processing device 10 according to the second exemplary embodiment except for the following points.

First, plural information processing devices 10 are provided with respect to one schedule management device 40. The plural information processing devices 10 are managed by different managers. Further, the plural information processing devices 10 manages different charging stations 22. The charging stations 22 are all connected to the same power network 44.

Further, it is necessary to match electric energy transmitted to one power network 44 with the sum of an electric energy demand of the plural charging stations 22 managed by the plural information processing devices 10.

Figure 21:
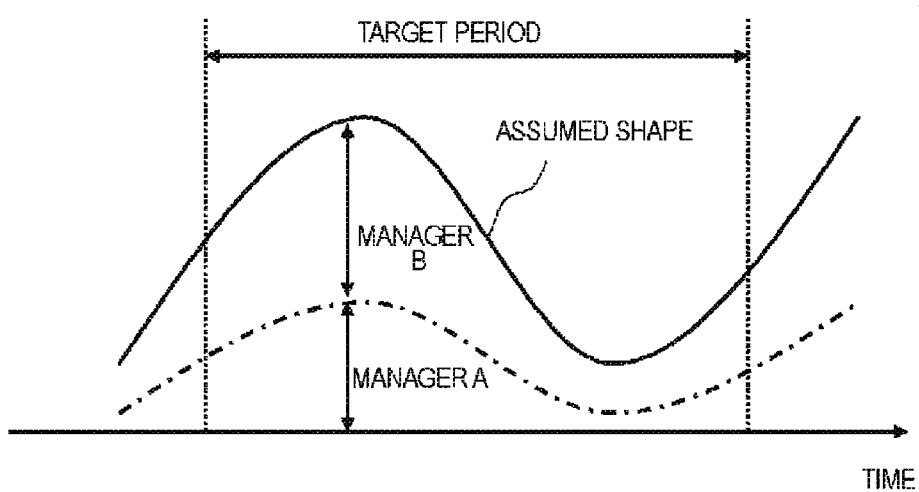
FIG. 21 is a diagram illustrating an operation of the information processing device according to the third exemplary embodiment.

FIG. 21 is a diagram illustrating an operation of the information processing device 10 according to this exemplary embodiment. The information processing device 10 according to this exemplary embodiment performs the same process as in the information processing device 10 according to the second exemplary embodiment in that the demand transition setting unit 140 performs the following processes.

First, the demand transition setting unit 140 calculates first power demand transition information and second power demand transition information so that transition in an electric energy demand accords with a function obtained by multiplying a first function which is shape information by a second constant. Here, the demand transition setting unit 140 adds a linear function having a negative coefficient to the first function after being multiplied by the second constant, and sets power demand transition information so that the sum of absolute values of differences between the first function and the power demand transition information becomes minimum. The second constant is a constant smaller than 1.

Specifically, processes are performed as follows. First, when the first function in the state of being obtained from the schedule management device 40 is represented as f(t), the second constant is represented as b, and the above-described linear function is represented as at, a first function f'(t,b) after correction is defined as follows.

$$f'(t,b) = bf(t) - at$$

Here, $f(t) \geq 0$.

Further, b and $W_t$ are set so that the following value becomes minimum.

$$\min: \Sigma(W_t - f'(t,b))^2$$

Here, $W_t$ represents a discretized function (second function) indicating power demand transition information. Further, $(W_t - f'(t,b))$ corresponds to $L_t$ shown in FIG. 13.

That is, in this exemplary embodiment, any power demand transition information calculated by each of the plural information processing devices 10 has a form based on an assumed shape due to the second constant b. Thus, if the respective pieces of power demand transition information of the plural information processing devices 10 are added up, the result of the addition accords with the first function, that is, the assumed shape.

According to this exemplary embodiment, it is possible to obtain the same effect as in the second exemplary embodiment. Further, even when there is an unexpected fluctuation in an electric energy demand managed by a certain information processing device 10, its influence on the entire electric energy demand is small.

Specifically, when the plural charging stations 22 connected to one power network 44 are managed by plural managers, a case where different time zones are allocated to the respective managers may be considered. In this case, when there is an unexpected fluctuation in an electric energy demand allocated by a certain information processing device 10, the supply-demand balance in the time zone in which the information processing device 10 is allocated is broken. On the other hand, in this exemplary embodiment, power transition information is set to follow a function obtained by multiplying a first function indicating an assumed shape by a second constant b which is smaller than 1. Thus, even when there is an expected fluctuation in an electric energy demand, the influence of the fluctuation on the entire system is reduced due to the second constant b.

Hereinbefore, the exemplary embodiments of the invention have been described with reference to the accompanying drawings, but these exemplary embodiments are only examples, and various configurations other than the above-described configurations may be employed.

According to the above-described exemplary embodiments, the following inventions are disclosed.

(Appendix 1)

An information processing device including:

a time range setting unit that sets an operation startable time point at which an operation can be started and a target operation end time point which is the latest time point among time points at which the operation is to be ended, with respect to each of a plurality of power demanding objects that generates power demand;

a necessary operation time setting unit that sets a necessary operation time which corresponds to a length of a time period during which the operation is to be performed, which is equal to or shorter than a time period from the operation startable time point to the target operation end time point, with respect to each of the plurality of power demanding objects;

a shape information acquisition unit that acquires shape information indicating an assumed shape of a transition line that represents transition in the amount of supplied power in a target period; and a demand transition setting unit that sets power demand transition information indicating transition in an electric energy demand in the target period so that the necessary operation time is obtained and so that the transition in the electric energy demand generated as the plurality of power demanding objects is operated accords with the assumed shape, wherein the demand transition setting unit updates the power demand transition information when the shape information acquisition unit updates the shape information, and wherein the information processing device further comprises a demand transition preliminary information generation unit that generates power demand transition preliminary information used in further updating the power demand transition information based on the power demand transition information after being updated and the power demand transition information before being updated.

(Appendix 2)

The information processing device according to Appendix 1, wherein the power demand transition information is a function that uses time as a variable, and wherein the demand transition preliminary information generates the power demand transition preliminary information based on the sum of a function obtained by multiplying the power demand transition information after being updated by a first coefficient and a function obtained by multiplying the power demand transition information before being updated by a second coefficient.

(Appendix 3)

The information processing device according to Appendix 2, wherein the demand transition preliminary information generation unit generates a plurality of pieces of power demand transition information after being updated based on each of a plurality of respective combinations of the first coefficient and the second coefficient.

(Appendix 4)

The information processing device according to any one of Appendixes 1 to 3, further including:

an upper and lower limit calculation unit that calculates, as a maximum electric energy demand, the electric energy demand in the target period in a case where a time zone included in the target period among time zones in which a power-consuming body is operated is set to be the longest, for each of the plurality of power-consuming bodies and calculates, as a minimum electric energy demand, the electric energy demand in the target period in a case where the time zone included in the target period among the time zones in which the power-consuming body is operated is set to be the shortest, for each of the plurality of power-consuming bodies, using the necessary operation time, the operation startable time point, and the target operation end time point, wherein the demand transition setting unit sets first power demand transition information so that the maximum electric energy demand can be obtained in the target period, and sets second power demand transition information so that the minimum electric energy demand can be obtained in the target period.

(Appendix 5)

The information processing device according to any one of Appendixes 1 to 4, wherein the shape information is a first function that represents the transition line, and wherein the demand transition setting unit adds a negative first constant to the first function, and sets the power demand transition information so that the sum of squares of differences between the first function and the power demand transition information becomes minimum.

(Appendix 6)

The information processing device according to Appendix 5, wherein the demand transition setting unit sets the first constant so that the first function is smaller than zero over the entire target period.

(Appendix 7)

The information processing device according to any one of Appendixes 1 to 4, wherein the shape information is a first function that represents the transition line, and wherein the demand transition setting unit sets the power demand transition information so that the transition in the electric energy demand accords with a function obtained by multiplying the first function by a second constant.

(Appendix 8)

The information processing device according to Appendix 7, wherein the demand transition setting unit adds a linear function having a negative coefficient to the first function, and sets the power demand transition information so that the sum of absolute values of differences between the first function and the power demand transition information becomes minimum.

(Appendix 9)

The information processing device according to Appendix 8, wherein the demand transition setting unit calculates the sum of squares of the differences between the first function and the power demand transition information while changing the second constant, and sets the second constant so that the sum becomes minimum.

(Appendix 10)

The information processing device according to any one of Appendixes 1 to 9, wherein the power demanding object is a rechargeable battery, and the operation is a charging operation of the rechargeable battery.

(Appendix 11)

The information processing device according to Appendix 10, wherein the rechargeable battery is mounted in each of electric vehicles, wherein the time range setting unit sets the operation startable time point and the target operation end time point of each of a plurality of the electric vehicles using travel history of each of the plurality of electric vehicles, and wherein the necessary operation time setting unit sets the necessary operation time of each of the plurality of electric vehicles using charging history of each of the plurality of electric vehicles.

(Appendix 12)

The information processing device according to any one of Appendixes 1 to 11, wherein the demand transition setting unit sets an operation schedule of each of the plurality of power demanding objects when setting the power demand transition information, and transmits the operation schedule to each of the plurality of power demanding objects.

(Appendix 13)

A power demanding object receiving the operation schedule from the information processing device according to appendix 12 and operating according to the operation schedule.

(Appendix 14)

An information processing method including:

setting an operation startable time point at which an operation can start and a target operation end time point which is the latest time point among time points at which the operation is to be ended, with respect to each of a plurality of power demanding objects that generates power demand;

setting a necessary operation time which corresponds to a length of a time period during which the operation is to be performed, which is equal to or shorter than a time period from the operation startable time point to the target operation end time point, with respect to each of the plurality of power demanding objects;

acquiring shape information indicating an assumed shape of a transition line that represents transition in the amount of supplied power in a target period, by a computer;

setting, so that the necessary operation time is obtained and so that transition in an electric energy demand generated by the plurality of power demanding objects being operated accords with the assumed shape, power demand transition information indicating the transition in the electric energy demand in the target period, by the computer;

updating the power demand transition information when the shape information acquisition unit updates the shape information, by the computer; and generating power demand transition preliminary information used in further updating the power demand transition information based on the power demand transition information after being updated and the power demand transition information before being updated, by the computer.

(Appendix 15)

The information processing method according to Appendix 14, wherein the power demand transition information is a function that uses time as a variable, and wherein the computer generates the power demand transition preliminary information based on the sum of a function obtained by multiplying the power demand transition information after being updated by a first coefficient and a function obtained by multiplying the power demand transition information before being updated by a second coefficient.

(Appendix 16)

The information processing method according to Appendix 15, wherein the computer generates a plurality of pieces of power demand transition information after being updated based on each of a plurality of respective combinations of the first coefficient and the second coefficient.

(Appendix 17)

The information processing method according to any one of Appendixes 14 to 16, wherein the computer calculates, as a maximum electric energy demand, the electric energy demand in the target period in a case where a time zone included in the target period among time zones in which a power-consuming body is operated is set to be the longest, for each of the plurality of power-consuming bodies and calculates, as a minimum electric energy demand, the electric energy demand in the target period in a case where the time zone included in the target period among the time zones in which the power-consuming body is operated is set to be the shortest, for each of the plurality of power-consuming bodies, using the necessary operation time, the operation startable time point, and the target operation end time point, and sets first power demand transition information so that the maximum electric energy demand can be obtained in the target period, and sets second power demand transition information so that the minimum electric energy demand can be obtained in the target period.

(Appendix 18)

The information processing method according to any one of Appendixes 14 to 17, wherein the shape information is a first function that represents the transition line, and wherein the computer adds a negative first constant to the first function, and sets the power demand transition information so that the sum of squares of differences between the first function and the power demand transition information becomes minimum.

(Appendix 19)

The information processing method according to Appendix 18, wherein the computer sets the first constant so that the first function is smaller than zero over the entire target period.

(Appendix 20)

The information processing method according to any one of Appendixes 14 to 17, wherein the shape information is a first function that represents the transition line, and wherein the computer sets the power demand transition information so that the transition in the electric energy demand accords with a function obtained by multiplying the first function by a second constant.

(Appendix 21)

The information processing method according to Appendix 20, wherein the computer adds a linear function having a negative coefficient to the first function, and sets the power demand transition information so that the sum of absolute values of differences between the first function and the power demand transition information becomes minimum.

(Appendix 22)

The information processing method according to Appendix 21, wherein the computer calculates the sum of squares of the differences between the first function and the power demand transition information while changing the second constant, and sets the second constant so that the sum becomes minimum.

(Appendix 23)

The information processing method according to any one of Appendixes 14 to 22, wherein the power demanding object is a rechargeable battery, and the operation is a charging operation of the rechargeable battery.

(Appendix 24)

The information processing method according to Appendix 23, wherein the rechargeable battery is mounted in each of electric vehicles, wherein the computer sets the operation startable time point and the target operation end time point of each of a plurality of the electric vehicles using travel history of each of the plurality of electric vehicles, and sets the necessary operation time of each of the plurality of electric vehicles using charging history of each of the plurality of electric vehicles.

(Appendix 25)

The information processing method according to any one of Appendixes 14 to 24, wherein the computer sets an operation schedule of each of the plurality of power demanding objects when setting the power demand transition information, and transmits the operation schedule to each of the plurality of power demanding objects.

(Appendix 26)

A program that causes a computer to realize:

a function of setting an operation startable time point at which an operation can start and a target operation end time point which is the latest time point among time points at which the operation is to be ended, with respect to each of a plurality of power demanding objects that generates power demand;

a function of setting a necessary operation time which corresponds to a length of a time period during which the operation is to be performed, which is equal to or shorter than a time period from the operation startable time point to the target operation end time point, with respect to each of the plurality of power demanding objects;

a function of acquiring shape information indicating an assumed shape of a transition line that represents transition in the amount of supplied power in a target period;

a function of setting, so that the necessary operation time is obtained and so that transition in an electric energy demand generated by the plurality of power demanding objects being operated accords with the assumed shape, power demand transition information indicating the transition in the electric energy demand in the target period;

a function of updating the power demand transition information when the shape information is updated; and a function of generating power demand transition preliminary information used in further updating the power demand transition information based on the power demand transition information after being updated and the power demand transition information before being updated.

(Appendix 27)

The program according to Appendix 26, wherein the power demand transition information is a function that uses time as a variable, and the program causes the computer to generate the power demand transition preliminary information based on the sum of a function obtained by multiplying the power demand transition information after being updated by a first coefficient and a function obtained by multiplying the power demand transition information before being updated by a second coefficient.

(Appendix 28)

The program according to Appendix 27, the program causes the computer to generate a plurality of pieces of power demand transition information after being updated based on each of a plurality of respective combinations of the first coefficient and the second coefficient.

(Appendix 29)

The program according to any one of Appendixes 26 to 28, the program causes the computer to further realize:

a function of calculating, as a maximum electric energy demand, the electric energy demand in the target period in a case where a time zone included in the target period among time zones in which a power-consuming body is operated is set to be the longest, for each of the plurality of power-consuming bodies and calculates, as a minimum electric energy demand, the electric energy demand in the target period in a case where the time zone included in the target period among the time zones in which the power-consuming body is operated is set to be the shortest, for each of the plurality of power-consuming bodies, using the necessary operation time, the operation startable time point, and the target operation end time point, and a function of setting first power demand transition information so that the maximum electric energy demand can be obtained in the target period, and sets second power demand transition information so that the minimum electric energy demand can be obtained in the target period.

(Appendix 30)

The program according to any one of Appendixes 26 to 29, wherein the shape information is a first function that represents the transition line, and the program causes the computer to add a negative first constant to the first function, and to set the power demand transition information so that the sum of squares of differences between the first function and the power demand transition information becomes minimum.

(Appendix 31)

The program according to Appendix 30, the program causes the computer to set the first constant so that the first function is smaller than zero over the entire target period.

(Appendix 32)

The program according to any one of Appendixes 26 to 29,
wherein the shape information is a first function that represents the transition line, and
the program causes the computer to set the power demand transition information so that the transition in the electric energy demand accords with a function obtained by multiplying the first function by a second constant.

(Appendix 33)

The program according to Appendix 32,
the program causes the computer to add a linear function having a negative coefficient to the first function, and to set the power demand transition information so that the sum of absolute values of differences between the first function and the power demand transition information becomes minimum.

(Appendix 34)

The program according to Appendix 33,
the program causes the computer to calculate the sum of squares of the differences between the first function and the power demand transition information while changing the second constant, and to set the second constant so that the sum becomes minimum.

(Appendix 35)

The program according to any one of Appendixes 26 to 34, wherein the power demanding object is mounted in each of electric vehicles, and
the program causes the computer to further realize:
a function of setting the operation startable time point and the target operation end time point of each of a plurality of the electric vehicles using travel history of each of the plurality of electric vehicles; and
a function of setting the necessary operation time of each of the plurality of electric vehicles using charging history of each of the plurality of electric vehicles.

This application claims the benefit of priority based on Japanese Patent Application No. 2013-227374 filed Oct. 31, 2013, the entire disclosure of which is incorporated herein by reference.

The invention claimed is:

1. An information processing device comprising:
a time range setting unit that sets an operation startable time point at which an operation can be started and a target operation end time point which is the latest time point among time points at which the operation is to be ended, with respect to each of a plurality of power demanding objects that generates power demand;
a necessary operation time setting unit that sets a necessary operation time which corresponds to a length of a time period during which the operation is to be performed, which is equal to or shorter than a time period from the operation startable time point to the target operation end time point, with respect to each of the plurality of power demanding objects;
a shape information acquisition unit that acquires shape information indicating an assumed shape of a transition line that represents transition in the amount of supplied power in a target period; and
a demand transition setting unit that sets power demand transition information indicating transition in an electric energy demand in the target period so that the necessary operation time is obtained and so that the transition in the electric energy demand generated by the plurality of power demanding objects being operated accords with the assumed shape,
wherein the demand transition setting unit updates the power demand transition information when the shape information acquisition unit updates the shape information, and
the information processing device further comprises: a demand transition preliminary information generation unit that generates power demand transition preliminary information used in further updating the power demand transition information based on the power demand transition information after being updated and the power demand transition information before being updated,
wherein the power demand transition information is a function that uses time as a variable, and
wherein the demand transition preliminary information generation unit generates the power demand transition preliminary information based on the sum of a function obtained by multiplying the power demand transition information after being updated by a first coefficient and a function obtained by multiplying the power demand transition information before being updated by a second coefficient.

2. The information processing device according to claim 1,
wherein the demand transition preliminary information generation unit generates a plurality of pieces of power demand transition information after being updated based on each of a plurality of respective combinations of the first coefficient and the second coefficient.

3. The information processing device according to claim 1, further comprising:
an upper and lower limit calculation unit that calculates, as a maximum electric energy demand, the electric energy demand in the target period in a case where a time zone included in the target period among time zones in which a power-consuming body is operated is set to be the longest, for each of the plurality of power-consuming bodies and calculates, as a minimum electric energy demand, the electric energy demand in the target period in a case where the time zone included in the target period among the time zones in which the power-consuming body is operated is set to be the shortest, for each of the plurality of power-consuming bodies, using the necessary operation time, the operation startable time point, and the target operation end time point,
wherein the demand transition setting unit sets first power demand transition information so that the maximum electric energy demand can be obtained in the target period, and sets second power demand transition information so that the minimum electric energy demand can be obtained in the target period.

4. The information processing device according to claim 1,
wherein the shape information is a first function that represents the transition line, and
wherein the demand transition setting unit adds a first constant which is negative to the first function, and sets the power demand transition information so that the sum of squares of differences between the first function and the power demand transition information becomes minimum.

5. The information processing device according to claim 1,
wherein the shape information is a first function that represents the transition line, and wherein the demand transition setting unit sets the power demand transition information so that the transition in the electric energy demand accords with a function obtained by multiplying the first function by a second constant.

6. The information processing device according to claim 1,
wherein the demand transition setting unit sets an operation schedule of each of the plurality of power demanding objects when setting the power demand transition information, and transmits the operation schedule to each of the plurality of power demanding objects.

7. A power demanding object receiving the operation schedule from the information processing device according to claim 6 and operating according to the operation schedule.

8. An information processing method comprising:
setting an operation startable time point at which an operation can be started and a target operation end time point which is the latest time point among time points at which the operation is to be ended, with respect to each of a plurality of power demanding objects that generates power demand;
setting a necessary operation time which corresponds to a length of a time period during which the operation is to be performed, which is equal to or shorter than a time period from the operation startable time point to the target operation end time point, with respect to each of the plurality of power demanding objects;
acquiring shape information indicating an assumed shape of a transition line that represents transition in the amount of supplied power in a target period, by a computer;
setting, so that the necessary operation time is obtained and so that transition in an electric energy demand generated by the plurality of power demanding objects being operated accords with the assumed shape, power demand transition information indicating the transition in the electric energy demand in the target period, by the computer;
updating the power demand transition information when the shape information is updated, by the computer; and
generating power demand transition preliminary information used in further updating the power demand transition information based on the power demand transition information after being updated and the power demand transition information before being updated, by the computer,
wherein the power demand transition information is a function that uses time as a variable, and
wherein the power demand transition preliminary information is generated based on the sum of a function obtained by multiplying the power demand transition information after being updated by a first coefficient and a function obtained by multiplying the power demand transition information before being updated by a second coefficient.

9. A non-transitory storage medium storing a program that causes a computer to realize:
a function of setting an operation startable time point at which an operation can be started and a target operation end time point which is the latest time point among time points at which the operation is to be ended, with respect to each of a plurality of power demanding objects that generates power demand;
a function of setting a necessary operation time which corresponds to a length of a time period during which the operation is to be performed, which is equal to or shorter than a time period from the operation startable time point to the target operation end time point, with respect to each of the plurality of power demanding objects;
a function of acquiring shape information indicating an assumed shape of a transition line that represents transition in the amount of supplied power in a target period;
a function of setting, so that the necessary operation time is obtained and so that transition in an electric energy demand generated by the plurality of power demanding objects being operated accords with the assumed shape, power demand transition information indicating the transition in the electric energy demand in the target period;
a function of updating the power demand transition information when the shape information is updated; and
a function of generating power demand transition preliminary information used in further updating the power demand transition information based on the power demand transition information after being updated and the power demand transition information before being updated,
wherein the power demand transition information is a function that uses time as a variable, and
wherein the power demand transition preliminary information is generated based on the sum of a function obtained by multiplying the power demand transition information after being updated by a first coefficient and a function obtained by multiplying the power demand transition information before being updated by a second coefficient.

* * * * *